US009519865B2

(12) United States Patent
Quirein et al.

(10) Patent No.: US 9,519,865 B2
(45) Date of Patent: Dec. 13, 2016

(54) APPARATUS AND METHODS OF ANALYSIS OF PIPE AND ANNULUS IN A WELLBORE

(75) Inventors: John Quirein, Georgetown, TX (US); Philip Edmund Fox, Covington, LA (US); Jerome Allen Truax, Humble, TX (US); Dingding Chen, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 364 days.

(21) Appl. No.: 14/125,271

(22) PCT Filed: Jun. 24, 2011

(86) PCT No.: PCT/US2011/041840
§ 371 (c)(1),
(2), (4) Date: Dec. 10, 2013

(87) PCT Pub. No.: WO2012/177262
PCT Pub. Date: Dec. 27, 2012

(65) Prior Publication Data
US 2014/0114892 A1    Apr. 24, 2014

(51) Int. Cl.
*G01V 11/00* (2006.01)
*G06N 5/04* (2006.01)
*E21B 47/00* (2012.01)

(52) U.S. Cl.
CPC ........... *G06N 5/047* (2013.01); *E21B 47/0005* (2013.01); *G01V 11/002* (2013.01)

(58) Field of Classification Search
CPC .............................. G06K 9/6298; G06N 3/008
See application file for complete search history.

(56) References Cited

U.S. PATENT DOCUMENTS 6,295,504 B1 *  9/2001  Ye ...................... G06K 9/622
                                                    702/11
6,374,185 B1 *  4/2002  Taner .................. G01V 1/282
                                                    367/73

(Continued)

FOREIGN PATENT DOCUMENTS

EP      1505252 A1       2/2005
WO      WO-2007002693 A2  1/2007
WO      WO-2012177262 A1  12/2012

OTHER PUBLICATIONS

"Canadian Application Serial No. 2,839,728, Office Action mailed Apr. 17, 2015", 4 pgs.

(Continued)

*Primary Examiner* — Luke Ratcliffe
*Assistant Examiner* — Hovhannes Baghdasaryan
(74) *Attorney, Agent, or Firm* — Schwegman Lundberg & Woessner, P.A.; Benjamin Fite

(57) ABSTRACT

Various embodiments include apparatus and methods to provide pipe analysis, annulus analysis, or one or more combinations of pipe analysis and annulus analysis with respect to one or more pipes in a wellbore. The analysis can include application of clustering and classification methods with respect to the status and the environment of the one or more pipes in the wellbore. In various embodiments, the clustering and classification can be used in characterizing borehole annular material including cement bond quality evaluation. Additional apparatus, systems, and methods are disclosed.

34 Claims, 27 Drawing Sheets

(56) References Cited

U.S. PATENT DOCUMENTS

| | | | |
|---|---|---|---|
| 6,505,130 B1 | 1/2003 | Springer, III et al. | |
| 2002/0052740 A1* | 5/2002 | Charlesworth | G06F 17/30038 704/220 |
| 2003/0043693 A1* | 3/2003 | Eastwood | G01V 1/366 367/41 |
| 2003/0193939 A1* | 10/2003 | Henrion | H04L 49/30 370/389 |
| 2003/0223620 A1* | 12/2003 | Anxionnaz | G01V 1/50 382/109 |
| 2004/0133531 A1* | 7/2004 | Chen | G06K 9/6298 706/8 |
| 2004/0260476 A1* | 12/2004 | Borgos | G01V 1/301 702/14 |
| 2006/0013065 A1* | 1/2006 | Varsamis | G01V 11/002 367/76 |
| 2006/0233048 A1* | 10/2006 | Froelich | G01V 1/50 367/35 |
| 2007/0250461 A1* | 10/2007 | Sabe | G06F 15/18 706/12 |
| 2008/0253665 A1* | 10/2008 | Mitarai | G06K 9/6252 382/227 |
| 2009/0292473 A1* | 11/2009 | Kruspe | G01V 3/32 702/8 |
| 2011/0115787 A1* | 5/2011 | Kadlec | G01V 1/345 345/419 |

OTHER PUBLICATIONS

"European Application Serial No. 11729028.8, Response filed Jul. 17, 2014 to Office Action mailed Jan. 16, 2014", 11 pgs.

"International Application Serial No. PCT/US2011/041840, Response filed Nov. 19, 2013 to Written Opinion Mailed Aug. 22, 2013", 2 pgs.

"European Application Serial No. 11729028.8, Office Action mailed Jan. 16, 2014", 2 pgs.

"International Application Serial No. PCT/US2011/041840, International Preliminary Report on Patentability mailed Dec. 19, 2013", 7 pgs.

Donovan, G., et al., "Acoustic Logging Techniques for Guiding Casing_Recovery Operations in Deepwater Gulf of Mexico", SPE 124638, *SPE Annual Technical Conference and Exhibition*, Oct. 4-7, 2009, New Orleans, Louisiana, (2009), 1-6.

Shook, E. H., et al., "Cement Bond Evaluation", SPE 108415, *SPE Western Regional and Pacific Section AAPG Joint Meeting*, Mar. 29-Apr. 4, 2008, Bakersfield, California, USA, (2008), 1-10.

Xu, R., et al., "Survey of Clustering Algorithms", *IEEE Transactions on Neural Networks, 16*(3), (2005), 645-678.

"International Application Serial No. PCT/US2011/041840, International Search Report Mailed Mar. 14, 2012", 4 pgs.

"International Application Serial No. PCT/US2011/041840, Written Opinion Mailed Mar. 14, 2012", 5 pgs.

"International Application Serial No. PCT/US2011/041840, Written Opinion Mailed Aug. 22, 2013", 6 pgs.

Eftekharifar, Mehdi, et al., "Extrapolation of Log Properties by Integrating Fuzzy-Self Organizing Maps and Local Linear Modeling", Seg Houston 2009 International Exposition and Annual Meeting, (2009), 1915-1919.

"Australian Application Serial No. 2011371570, Office Action mailed Apr. 23, 2015", 3 pgs.

"International Application Serial No. PCT/US2011/041840, Response filed Apr. 24, 2013 to Written Opinion Mailed Mar. 14, 2012", 2 pgs.

"Canadian Application Serial No. 2,839,728, Response filed Oct. 5, 2015 to Office Action mailed Apr. 17, 2015", 22 pgs.

"Mexican Application Serial No. MX/a/2013/015044, Office Action mailed May 11, 2016", w/ English Translation, 2 pgs.

"Mexican Application Serial No. MX/a/2013/015044, Office Action mailed Aug. 17, 2016", (w/ English Translation), 4 pgs.

"Mexican Application Serial No. MX/a/2013/015044, Response filed Jul. 20, 2016 to Office Action mailed May 11, 2016", (w/ English Translation of Claims), 45 pgs.

\* cited by examiner

Variable Index Number (1=Amp, 2=Fcembi, 3=Smfw, 4=Fcps 5=Zavg)

*Variable Index Number (1=Amp, 2=Fcembi, 3=Smfw, 4=Fcps 5=Zavg)*

*Variable Index Number (1=Amp, 2=Fcembi, 3=Smfw, 4=Fcps 5=Zavg)*

| C-Number | C-Size | C-Number | C-Size | C-Number | C-Size |
|---|---|---|---|---|---|
| 1 | 17 | 11 | 34 | 21 | 1 |
| 2 | (1757) | 12 | 82 | 22 | 3 |
| 3 | (312) | 13 | 6 | 23 | 14 |
| 4 | (2417) | 14 | 4 | 24 | 3 |
| 5 | (290) | 15 | 5 | 25 | 39 |
| 6 | 36 | 16 | 18 | 26 | 23 |
| 7 | 8 | 17 | 2 | 27 | 5 |
| 8 | (1242) | 18 | (2304) | 28 | 24 |
| 9 | 12 | 19 | 2 | 29 | 8 |
| 10 | 25 | 20 | 2 | 30 | 6 |

*FIG. 12*

APPARATUS AND METHODS OF ANALYSIS OF PIPE AND ANNULUS IN A WELLBORE

PRIORITY APPLICATION

This application is a U.S. National Stage Filing under 35 U.S.C. 371 from International Application Number PCT/US2011/041840, filed on 24 Jun. 2011, and published as WO 2012/177262 A1 on 27 Dec. 2012; which application and publication are incorporated herein by reference in their entirety.

TECHNICAL FIELD

The present invention relates generally to apparatus related to oil and gas exploration.

BACKGROUND

During operations of well completion or after successful well completion, remedial wellbore mechanical repair and pipe recovery often require determination of intervals over the well depths where un-bonded casing pipes are free to be removed. Additionally an analysis of the character of materials within the annulus is beneficial to decision making processes. The annulus is the space between two objects, such as between the wellbore and casing, where the casing is a pipe disposed in the wellbore, or between casing and tubing. Current commercial sonic/ultrasonic logging tools and diverse processing programs produce substantial information in curves and waveforms for annular bond evaluation. Logging tools can provide a log, which is a measurement of one or more physical quantities in or around a well as a function of depth, time, or both depth and time. A limitation of current technology is its integration level with respect to decision-making. Many waveforms are coded in an image that is suitable for log visualization, but not convenient for automatic processing. Some other amplitude curves and index curves reflect or reveal only partial information over the entire transmission chain of sonic/ultrasonic signals between casing pipe and cement and between cement and formation as well as other materials within the measurement volume. The comprehensive patterns with different scales from various tools and processing programs are so complicated such that even the experienced log analysts sometimes have the difficulty to identify the real patterns from the signal response including noisy data and artifacts of the processing algorithms.

BRIEF DESCRIPTION OF THE DRAWINGS

FIGS. 9-1-9-30 show a non-limiting example of a self-organized feature map applied to clustering cement bond and pipe annular fill logging data, in accordance with various embodiments.

FIG. 10 shows a code image indicating connection distances of clusters for an example classification, in accordance with various embodiments.

FIG. 11 shows a hierarchical clustering applied to cement bond and annular fill logging data, in accordance with various embodiments.

FIG. 12 shows cluster sizes indicating dominant clusters for classification, in accordance with various embodiments.

FIG. 13 shows a non-limiting example of weighting vectors of clusters with a self-organized feature map, in accordance with various embodiments.

FIG. 14 shows a non-limiting example of centroid vectors of clusters with hierarchical clustering, in accordance with various embodiments.

FIG. 15 shows cross plots of variables where values for bound pipe response and values for free pipe response are indicated, in accordance with various embodiments.

FIG. 16 shows cross plots of variables from FIG. 15 that have been normalized, in accordance with various embodiments.

FIG. 17 shows results from a typical well, in accordance with various embodiments.

FIG. 18 depicts a block diagram of features of an example system having components to analyze measurement data from a tool unit, in accordance with various embodiments.

DETAILED DESCRIPTION

Figure 1:
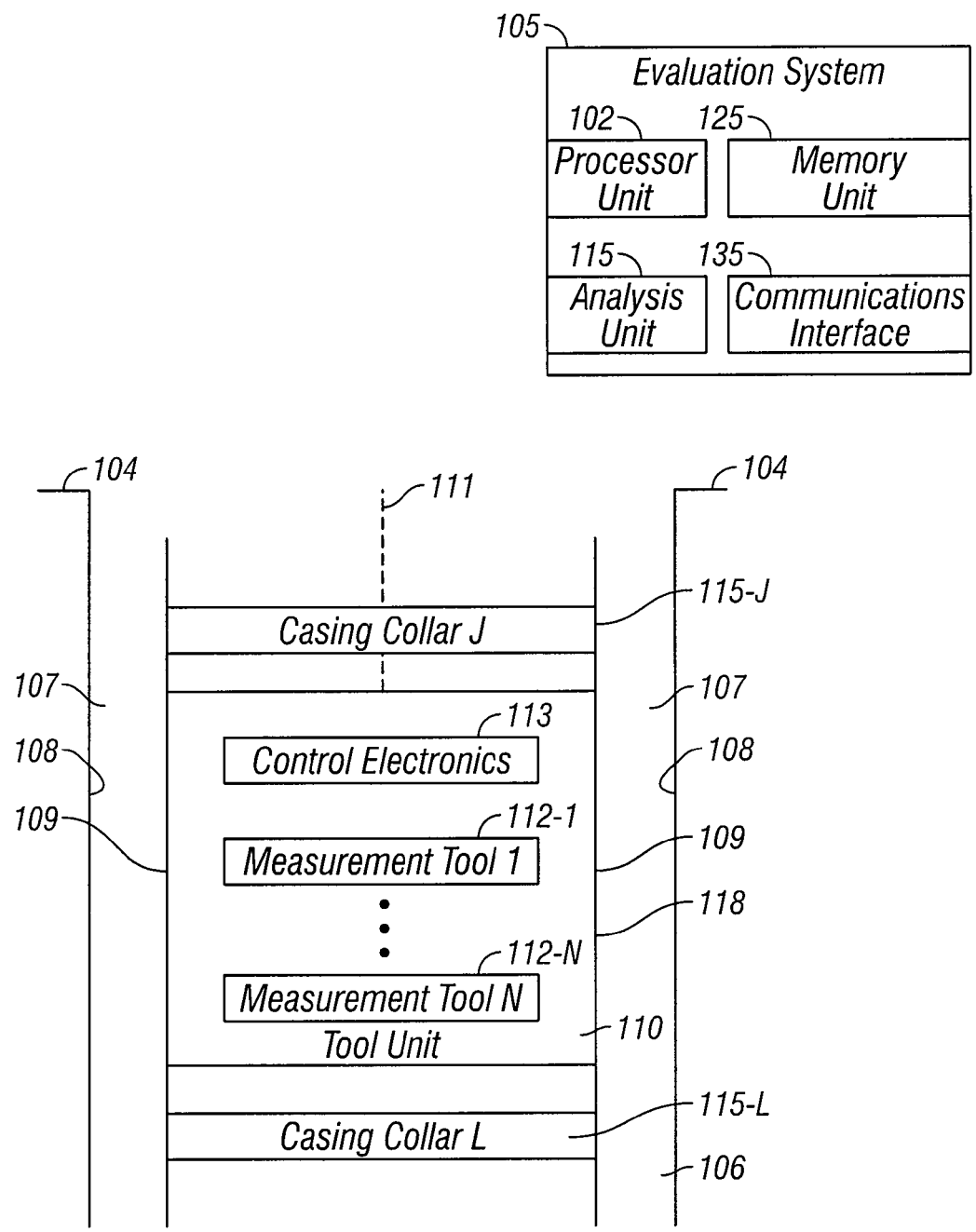
FIG. 1 shows a block diagram of an evaluation system configured to provide analysis of pipe and/or annulus with respect to the pipe in a borehole, according to various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, methods and apparatus are directed to the analysis of pipe and annulus in a wellbore (which is also referred to as borehole). The analysis can include cement bond analysis with respect to one or more pipes, annular fill analysis with respect to the one or more pipes, or combinations of cement bond analysis and annular fill analysis. Such methods and apparatus can provide a mechanism to evaluate annular materials and the relationship to their respective pipes. These methods and apparatus can operate in a de-completion mode to evaluate the downhole environment with respect to disposed pipes, the status of these pipes, the structure around these pipes within the borehole, and the relationship of the pipes to the structures around these pipes within the borehole. The evaluation of annular material can include, for example, evaluation of dehydrated drilling muds including barite settled intervals along with the bonding of the respective pipes to cement and the cement to the borehole wall. The analysis of the cement bond may be viewed as a clearly defined end of the analysis spectrum. The evaluation spectrum can also include the evaluation of transitional bound pipe and determination of the presence or absence of bound pipe. For discussion purposes, various embodiments of methods and apparatus to evaluate pipes and the environment in which the pipes are disposed in borehole may be presented herein using non-limiting examples related to cementing applications. However, these methods and apparatus are not specific only to cementing applications/interpretation. Bound pipe analysis outside of cemented intervals provides a useful tool in the cut and pull of pipes process during well abandonment. In addition, herein "A/B" (A and/or B) means "A" or "B" or one or more combinations of "A" and "B." For example, cement bond and/or annular fill analysis (cement bond/annular fill analysis) means cement bond analysis, annular fill analysis, or one or more combinations of cement bond analysis and annular fill analysis.

The cement bond and/or annular fill analysis can include cement bond and/or annular material characteristics clustering and classification methods. Execution of these methods can be based on data from logging tools that produce substantial information in curves and waveforms for evaluation of bonding and/or material characterization in the annular region between casing pipes and borehole walls as well as responses through the earth formations (rock), which can include annular volume material classification. The curves can be provided as individual measurements and associated computations and the waveforms can be provided as vectors of elements. The cement bond and/or annular fill evaluation can also be used as the basis for advanced processing and operations improvement in future work, where the sensor responses can provide additional training data for an evaluation system. Such apparatus and methods can be arranged to retrieve measurement values and waveforms from logging data, to extract feature information from the waveforms and other sensors, and to perform clustering and classification. Responses from other sensors may be provided or stored digitally. The clustering and classification can be used in characterizing borehole annular material including cement bond quality evaluation. The apparatus and methods can be configured to interpret results and to generate user-friendly solutions regarding the pipe in the borehole. Interpreted results can be provided as a function of depth. The results can be provided in a number of ways including as numerical values in a bounded interval such that the results reflect a probability of the casing pipe being free or bounded. A confidence level of the probability can be provided from a number of training, validation, and testing operations of the evaluation system for a number of different wells.

FIG. 1 shows a block diagram of an embodiment of an evaluation system 105 configured to provide analysis of pipe and/or annulus with respect to a pipe 118 in a borehole 106. The analysis of pipe and/or annulus can include cement bond analysis and/or annulus fill analysis. Pipe 118 extends from surface 104 as a string of pipes connected by casing collars such as casing collar 115-J and casing collar 115-L. A casing collar typically has a thickness (and corresponding mass) different from the casing pipes it connects. This thickness difference can induce different responses using a measurement tool that measures sensor responses within a casing pipe and its associated casing collars. Annular region, annulus, 107 between surface 108 of borehole 106 and surface 109 of pipe 118 can be filled with cement, brine, drilling mud, and other materials. The quality of the cement bonding in annular region 107 can vary along the depth of pipe 118 in borehole 106. The quality of the cement bonding in annular region 107 can also vary in the radial direction from surface 109 to surface 108 including the cement-pipe interface at surface 109 and the cement-borehole interface at surface 108. Along the depth of pipe 118, the nature of the cement bonding can range from no bonding, that is, the pipe is free of bonding to the cement or other materials to complete bonding such that the pipe is bound to the cement or other materials.

The bonding of pipe 118 along borehole 106 can be evaluated using data from a tool unit 110 disposed in pipe 118. Tool unit 110 can be disposed in pipe 118 using a cable-like structure 111. Measurement can also be taken on pipe conveyed systems such as logging-while-drilling (LWD). Memory telemetry can also be deployed by a number of methods to acquire responses to be utilized in analysis. Tool unit 110 can be arranged with measurement tool 112-1 . . . measurement tool 112-N, where N is not limited to a specific number. N can be chosen based on the application to which tool unit 110 is used. Though tool unit 110, having measurement tools 112-1 . . . 112-N, is shown as being disposed between casing collar J and another casing collar L, measurement tools 112-1 . . . 112-N can be distributed among any number of casing collars and is not fixed within one integrated tool unit 110. N can be any integer reflecting that the number of measurement tools is not limited to a fixed number. In addition, measurement tools 112-1 . . . 112-N can include a number of different types of measurement tools. Further, the number of measurement tools can change over time. Measurement tool 112-1 . . . measurement tool 112-N can include, for example, one or more of a sonic tool, an ultrasonic tool, a neutron tool, a pulsed neutron tool, or other tool operable to make measurements related to a pipe, annular volume or formation in a well environment. These responses may individually or in conjunction of any combination of responses contribute to the recorded measurements. Each measurement tool 112-1 . . . 112-N can be disposed with their own electronics, which can include a communications unit to send measured data to surface 104. Tool unit 110 can also include control electronics 113 to manage measurement tools 112-1 . . . 112-N including communication to surface 104. In addition to casing pipe, measurements by tool unit 110 also can include measurements relative to multiple pipes including tubing, multiple tubing, and multiple casing strings as well as earth formation (rock) responses.

Data measured using tool unit 110 can be sent to surface 104, where the data can be stored in a memory unit. The memory unit may include a number of memory devices and be a distributed system. The measured data from tool unit 110 can be stored in a memory unit accessible to evaluation system 105 using communication interface 135 via an external communication vehicle or the measured data can be stored in memory unit 125 of evaluation system 105. Memory unit 125 can include an electronic source file or files arranged to store waveform data from measurement tools operating with respect to the pipe in a borehole. Memory unit 125 can also store training data and other data related to characteristics of various status of a pipe relative to cement or other materials in a borehole environment from well sources other than the well having borehole 106.

Communication interface 135 can also be arranged relative to transmission of the measured data from tool unit 110 into memory unit 125.

Memory unit 125 is operably coupled to processor unit 102. Processor unit 102 can include one or more processors to control acquisition of the measured data and processing of the measured data for cement bond and/or annular fill analysis. Processor unit 102 can be arranged to execute instructions in analysis unit 115 to perform cement bond and/or annular fill analysis with respect to pipe 118 and annular in a borehole 106, for example. The cement bond and/or annular fill analysis can include cement bond and/or annular fill clustering and classification methods and other response clustering and classification methods.

Analysis unit 115 can include a machine-readable storage device having instructions stored thereon, which, when performed by a machine, cause the machine to perform operations, where the operations include conducting cement bond and/or annular fill analysis with respect to pipe in a borehole. The operations conducted can include operations similar or identical to operations associated with any of the apparatus and methods of FIGS. 2-18. Processor unit 102, memory unit 125, and analysis unit 115 can be configured to perform such operations. A machine-readable storage device is a physical device that stores data represented by physical structure within the storage device. Examples of machine-readable storage devices include, but are not limited to, memory units or memory devices such as read only memory (ROM), random access memory (RAM), a magnetic disk storage device, an optical storage device, a flash memory, and other electronic, magnetic, and/or optical memory devices. Analysis unit 115 can be separate from memory unit 125, integrated with memory unit 125, or partially integrated with memory unit 125. Evaluation unit 105 and tool unit 110 provide a system that includes one or more logging tools, where the one or more logging tools are operable to conduct measurements in a pipe or multiple pipes arranged in a borehole to generate tool responses used in analysis unit 115 to generate cement bond and/or annular fill responses correlated to cement bonding and/or annular fill conditions of pipe 118 in borehole 106.

Initial processing of evaluation system 105 can be directed to a known well in which the status of the pipe, with respect to being free or bound, is known over the depth of the well or substantial portions of the depth. Further processing of evaluation system 105 can be conducted to determine the parameters of evaluation system 105 through training. The training for unsupervised classification can include producing competitive neural networks to organize feature map, and deriving hierarchical dendrograms or using other clustering algorithms to specify clusters. The training for supervised classification can include determining transformation matrix for class assignment, and refining information regarding the status of a pipe in a borehole, where the status can include free pipe, bonded pipe, transition pipe in which the pipe is not free or completely bound, difference between a casing pipe and a casing collar connecting casing pipes. The training can also include storing information regarding parameters, such as but not limited to, different well environments, different filling materials, different size well boreholes, and different size casings. The stored information can include responses to different logging tools with respect to different parameters. This training information can be used by evaluation tool 105 to generate a bonding profile of a pipe in a borehole using logging data, where such a profile has not been previously determined.

Figure 2:
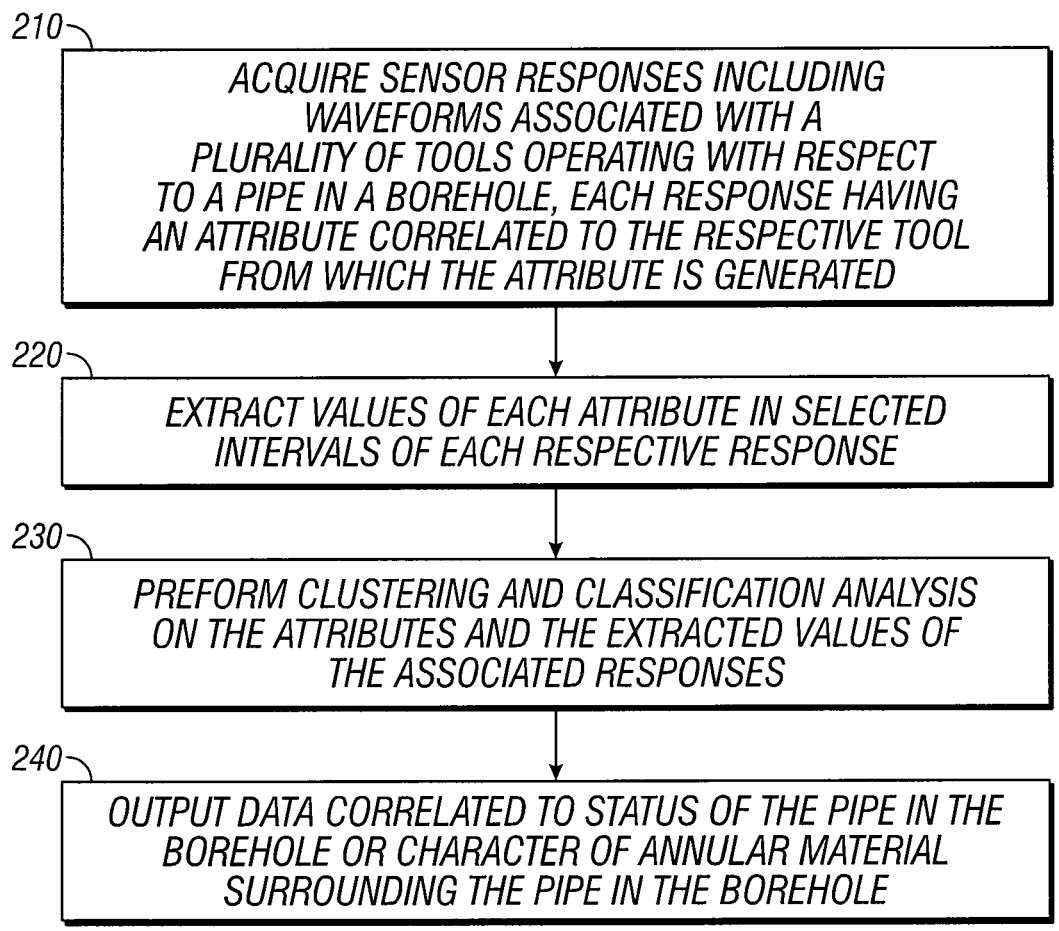
FIG. 2 shows features of example method directed to analysis of pipe and/or annulus with respect to the pipe, or multiple pipes, in a borehole, according to various embodiments.

FIG. 2 shows features of an embodiment of an example method directed to analysis of pipe and/or annulus with respect to the pipe or multiple pipes in a borehole. Analysis can also be directed to annular volume material classification. At 210, waveforms and other tool responses associated with a plurality of tools operating with respect to a pipe in a borehole are acquired. The plurality of tools can include different types of tools. Each waveform or sensor response provides data collected from its respective tool and each waveform or sensor response has an attribute correlated to the respective tool from which the attribute is generated. The acquisition of the waveforms and other sensor responses can be conducted under the control of a processor unit. The waveforms can be acquired from one or more source data files. The source data files may be separate from the evaluation unit that acquires and processes data from these source data files.

The attributes can include a refracted acoustic amplitude, a filtered cement bond index, a sum of magnitude at a selected frequency band of an acoustic waveform of a micro seismogram, a far detector count rate from a dual-spaced pulsed neutron logging tool, an ultrasonic average impedance, or combinations thereof. The attributes can be expandable to other sensor responses not listed herein. Additional sensors may be utilized to acquire other responses useful in the modeling and analysis results. These attributes correspond to respective measurement tools from which the attributes are generated. The attributes can be used as variables in the procedures for performing cement bond and/or annular fill analysis with respect to a pipe in a borehole.

At 220, values of each attribute in selected intervals of each respective waveform or other sensor response are extracted by the processor unit operating on the waveform. The extracted values are stored in a memory device. The memory device can be part of the memory unit having an electronic source file or files from which the waveforms are acquired. Alternatively, the memory device can be separate from such a memory unit. The memory device can realized by any structure that can store electronic data either for long term storage or for short term storage accessible as an entity engaged in the processing of data. Extracting values of each attribute in the selected intervals of each respective waveform or sensor can include extracting values in a time domain or a frequency domain.

At 230, clustering and classification analysis are performed on the attributes and the extracted values of the associated waveforms or sensors. This analysis can be conducted by the processor unit operating on the attributes and the extracted values of the associated waveforms or sensor responses. Prior to performing the clustering and classification analysis, the extracted values of each attribute can be normalized. Performing clustering and classification analysis can include processing the attributes and the extracted values of the associated waveforms or sensors by the processing unit arranged to generate one or more of a self organized feature (SOFM) map, a hierarchical clustering (HC), or a weighted response function (WRF) classification. Processing the attributes and the extracted values can include using stored default settings or settings generated from user preferences. Performing clustering and classification analysis can include quantitatively evaluating cluster quality of a cluster based on a centroid vector generated by the processor unit correlated to the cluster. In a self organized feature map analysis, cluster centroid vectors can be generated from weighting vectors of each neuron of the SOFM technique. In a hierarchical clustering analysis, an average of the values of attributes in each cluster can be generated to form a cluster centroid vector of the respective cluster.

In various embodiments, the example method can include performing other analysis procedures. Patterns of cement bond and/or annular material characterization at a specified depth can be identified using a material signature. For example, a signature provides a distinguishing feature in a waveform or sensor, where the distinguishing feature relative to a waveform or sensor for a particular measurement can be stored in a memory unit. Using a material signature to identify patterns of cement bond and/or annular fill characterization can be realized by comparing current measurement responses with responses predicted by or anticipated by responses calibrated from measurements taken or deduced from other wells.

Performing the clustering and classification analysis can include using a weighted response function analysis such that weights of the weighted response function analysis are adjusted to determine a best match with respect to an expected bound pipe response and an expected free pipe response or a transitional condition. Performing a particular clustering analysis can include using a first analysis technique, performing clustering analysis using a second analysis technique, and comparing results of the first analysis technique with results of the second analysis technique. Performing the clustering and classification analysis can include merging clusters to form classes based upon a service requirement. Merging clusters can include merging clusters with a number of classes specified by a user or merging clusters with the classes derived from natural grouping. Merging clusters can include merging the clusters based on a probability index of each class, where the probability index is calculated from a weighted response function analysis.

Results from performing the clustering and classification analysis can be refined. The refining can include using information in addition to the extracted values and associated waveforms and/or using knowledge based criteria. Processing can also include a validation procedure. A classification resulting from performing clustering and classification analysis can be subjected to a validation using one or more cross plots on a selected training well and the well being tested. Each cross plot provides a plot of one of the attributes (variables) with respect to another one of the attributes (variables). If the validity of the comparison of attributes of the well being evaluated meets a threshold level, cluster weights derived from the training well can be stored in a memory such that the stored cluster weights can be used directly to classify data of a new well without re-clustering. If the validity of the comparison of attributes of the well being evaluated meets a threshold level, rules for cluster merger derived from the training well can be stored in a memory such that the stored rules for cluster merger can be used directly to classify data of the new well without re-clustering.

At 240, data correlated to status of the pipe in the borehole or character of annular material surrounding the pipe in the borehole is output. Data correlated to status of the pipe can include, but is not limited to, data correlated to cement bonding of the pipe or multiple pipes in the borehole. Data correlated to character of annular material surrounding the pipe in the borehole can include data correlated to characterization of annular materials surrounding the pipe or multiple pipes in the borehole. The data can be output to a memory. The data output to the memory can include cement bond classes. The data output can include annular material characterization classes. Outputting the data correlated to status of cement bonding or annular fill character of the pipe in the borehole can include outputting cement bond classes to the one or more source data files from which the waveforms were acquired. Outputting data can include outputting data to a display unit such as a screen, a printer, or other device that can provide a mechanism to display the data to a user. The data displayed can be arranged on the display unit in a user-friendly manner. In addition to displaying the cement bond or annular fill character classes on a display input, one or more log views can be displayed on the display unit, where the log views are correlated to conducting one or more of activities that can include acquiring the waveforms or other sensor responses, extracting the values of each attribute, or performing the clustering and classification analysis.

In various embodiments, a data processing system can be configured having the capacity to extract feature information from available logging data associated with a borehole, perform automatic clustering/classification over selected intervals using variables and algorithms to understand hidden data structure from the logging data. The data processing system can be constructed in a combination of hardware and software based components. The combination of hardware and software based components can provide one or more user interfaces that allow a user to view results generated by the underlying data processing system. The user interfaces provide a mechanism for a user to input parameters used as setting in the automatic analysis and processing by the data processing system. The user interfaces can provide a mechanism for a user to input parameters such that the user can interactively participate in the analysis of the logging. Such a mechanism allows integrating sets of natural patterns, determined from the data processing system performing automatic clustering/classification, with user expertise to optimize decision making in determining the annular volume material character. This integration can be conducted with different sensors to provide the logging data interpretation. Sensor deployment methods can include, but are not limited to, electric wireline, coiled tubing, slickline, and logging-while-drilling. Measurement data can be sourced as realtime or stored by memory logging tool methods. In addition, various wellbore environments and service requirements can be used to enhance analysis resolutions of the processing.

In various embodiments, a cement bond/annular volume material clustering and classification system, as taught herein, can include a number of different processing routines and user interfaces. Such processing routines and user interfaces can be configured to conduct one or more of the following procedures. The cement bond/annular fill character clustering and classification system can be configured to read input from source data file or files, which include curves and waveforms from different tools. The cement bond/annular fill character clustering and classification system can be configured to extract feature information from waveforms in time domain or frequency domain, with reduced dimensionality as needed, and apply necessary preprocessing/normalization. The cement bond/annular fill character clustering and classification system can be configured to perform basic clustering and classification analysis such as SOFM, HC, and WRF weighted response function classification on selected variables and waveforms and other sensor responses, using either default settings or user-preferred settings. The cement bond/annular fill character clustering and classification system can be configured to evaluate cluster quality and identify typical patterns of cement bond/annular fill characteristic using expert indicated signature at a specified depth, reselect a clustering algorithm, or adjust the weights of WRF if needed to find the best match. The cement bond/annular fill character clustering and classification system can be configured to conduct cluster merger to form basic classes based upon the service requirement. A solution of the cement bond/annular fill character clustering and classification system can be the individual classes with the number of classes specified by a user or derived from natural grouping. A solution of the cement bond/annular fill character clustering and classification system can also be a probability index of each class calculated from WRF. The cement bond/annular fill character clustering and classification system can be configured to refine the classification results using additional information and knowledge based criteria to minimize the uncertainty due to the limitation of selected clustering algorithm. The cement bond/annular fill character clustering and classification system can be configured to validate a classification through cross plots and log view on a selected training well and a well being tested. If validity on the well being tested is justified, the cluster weights from the training well can be used directly to classify the data of the new well without re-clustering, and the same rules for cluster merger can apply to classify the data of the new well without re-clustering. The cement bond/annular fill clustering and classification system can be configured to output finalized cement bond/annular fill classes to the source file from which input data for the process was acquired and provide user-friendly log view for users.

Waveform and other sensor data obtained from borehole measurement tools such as sonic/ultrasonic tools provide potential to improve bound pipe, transitionally/partially bonded pipe, and free pipe evaluation in various aspects. Advanced clustering algorithms for large-scale data provided by some know methods, such as SOFM for example, can be used for waveform and sensor processing directly. However, since waveforms usually consist of high-dimensional elements, a problem may arise if several waveforms need to be included in the processing without dimensionality reduction.

Figure 3:
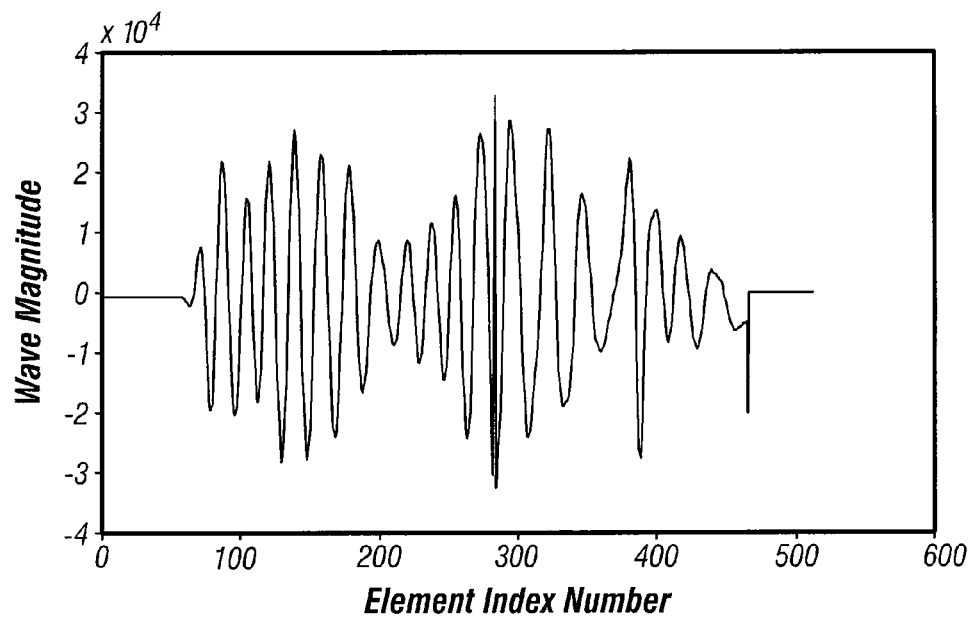
FIG. 3 shows a waveform of a micro seismogram in time domain, in accordance with various embodiments.

FIG. 3 shows an example waveform of a micro seismogram in the time domain. The example waveform presents a typical acoustic waveform of a micro seismogram (WMSG) obtained from a cement bond log (CBL) tool, which contains 512 elements and includes information about both the cement-to-pipe bond and the cement-to-formation bond. WMSG is usually depicted as a "total energy wave." The classic interpretation of the image of the WMSGF is that straight traces indicate that there is no cement in the annular, while any variation or distorted trace indicates that some cement is present. Coupling between pipe and earth formation rock will allow responses from the rock to be detected as part of the recoded waveform.

Figure 4:
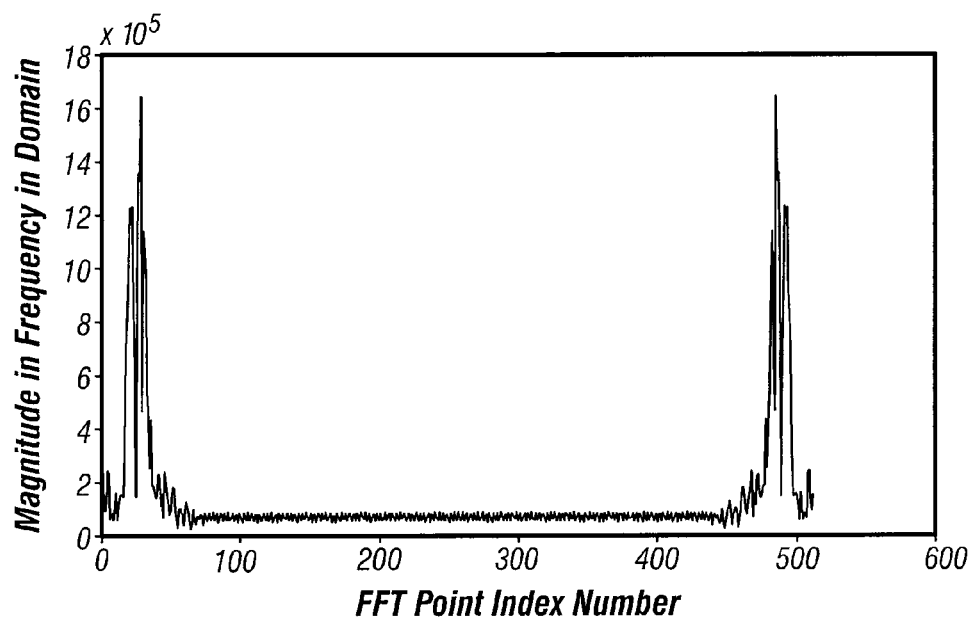
FIG. 4 shows a waveform of a micro seismogram in the frequency domain, in accordance with various embodiments.

FIG. 4 shows a waveform of a micro seismogram in the frequency domain. From comparing amplitudes of the frequency response under control of a processor, the frequency response can be characterized with 3 peaks spanned over a narrow frequency band. The spectrum of FIG. 4 was generated as a fast Fourier transform (FFT) with 512 points. Information from the spectrum can represent relevant energy with respect to pipe, annular, and formation with reduced dimensionality, which is be extracted.

Figure 5:
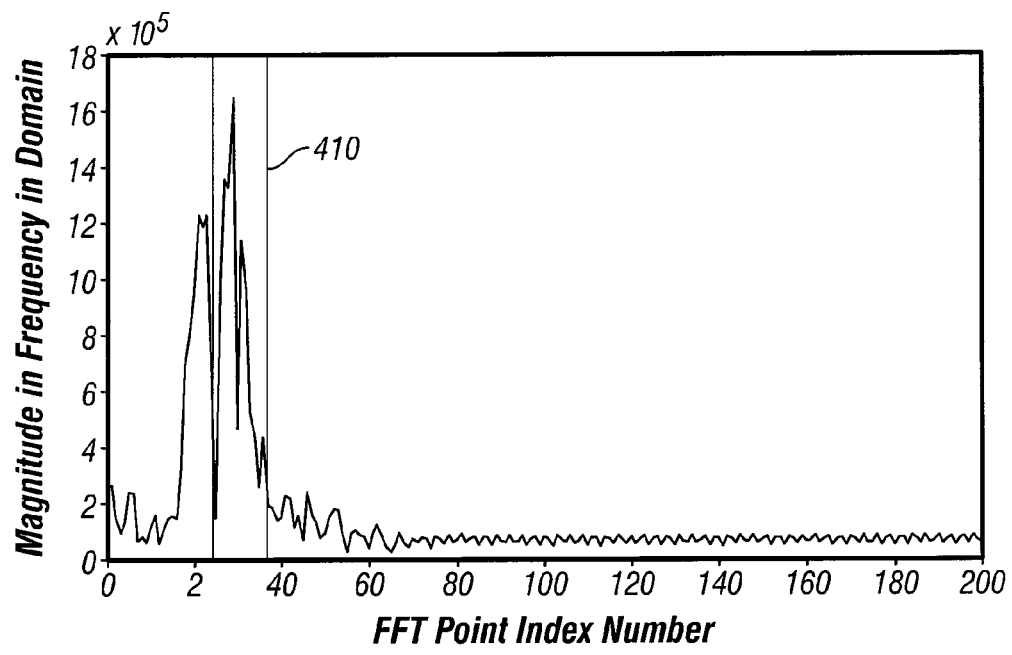
FIG. 5 shows a frequency band of FIG. 4 selected as a feature for further analysis, in accordance with various embodiments.
Figure 6:
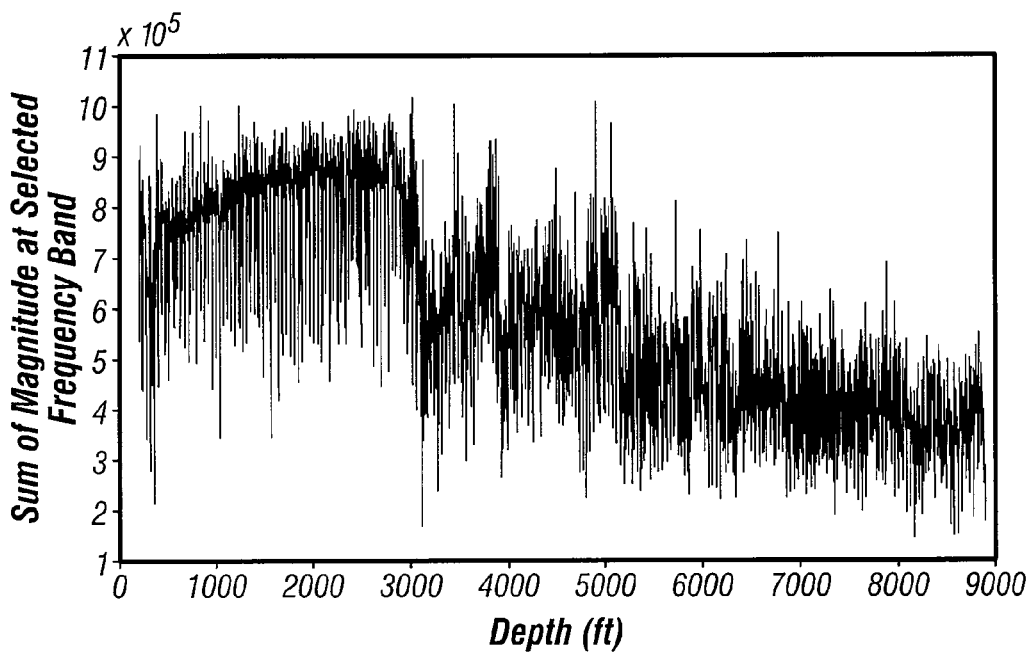
FIG. 6 shows a sum of magnitude at selected frequency band over the well depth, in accordance with various embodiments.

FIG. 5 shows a frequency band 410 of FIG. 4 selected as feature for further analysis. As a first try, the sum of magnitude over the band from point 25 to point 35 can be calculated, which basically covers the spectrum centered at the second peak and the third peak shown. To demonstrate the potential of a sum of magnitude over selected frequency response of waveform (SMFW) as a feature parameter, FIG. 6 shows SMFW plotted over the well depth. It was determined that the curve of FIG. 6 matches knowledge based expectation from taking other logging curves as reference.

Many clustering algorithms are available based on diverse principles such as distance and similarity measures, hierarchical and graph theory, squared error, combinatorial search, neural networks, and fuzzy inference. There is no clustering algorithm that can be universally used to solve all problems. Some algorithms are better than others in the context of catching particular features or under certain conditions, and the results might be quite different even if the same number of clusters is selected using two clustering methods. For a given application, different approaches can be compared to make an optimal decision.

The example below compares a neural network based SOFM method with a traditional HC method applied to normalized input curves of cement bond/annular fill logging data from a single well. The SOFM algorithm utilizes a competitive neural network to initialize and update a number of neuron weighting vectors corresponding to the centroid of each cluster. The determination of the weighting vectors can be conducted through iterative training by using a Kohonen rule. Conventionally, the Kohonen rule provides an update rule used to train SOFM that is a competitive learning update rule. In classification, the new sample will fill in a certain cluster if its input vector has the nearest distance to that neuron vector. The winner neuron (cluster) outputs 1 and other neurons output 0.

Figure 7:
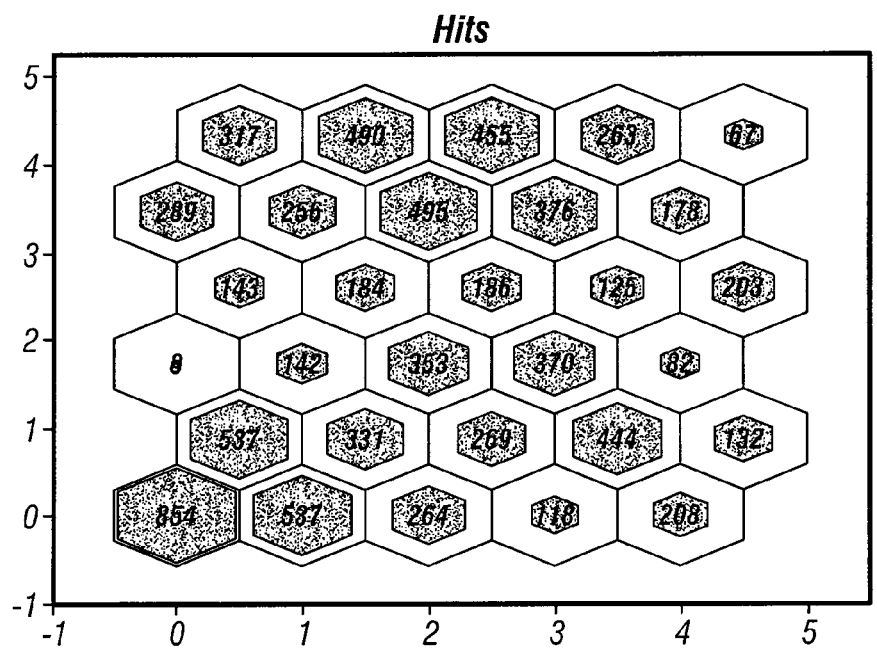
FIG. 7 shows a size of each cluster determined from training a competitive neural network, in accordance with various embodiments.

As an illustrative example, the dynamic data range of five input curves, having about 8700 samples for each curve, are normalized between −1 to +1 for the convenience of cluster visualization. The number of clusters is a parameter that be configured as a user setting. For this example, consider the number of clusters initialized to 30. FIG. 7 shows a size of each cluster determined from training a competitive neural network. The actual hits of samples shown range from 8 to 854 on the clusters after the training of the competitive network.

Figure 8:
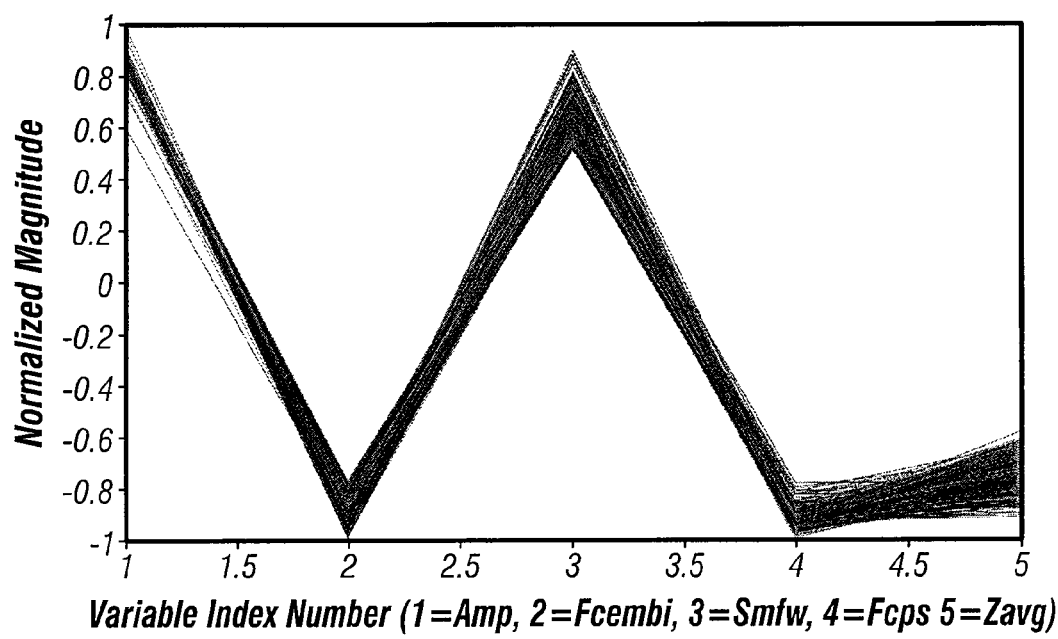
FIG. 8 shows a non-limiting example of a cluster profile of free pipe applied to normalized inputs, in accordance with various embodiments.

FIG. 8 shows a non-limiting example of a cluster profile of free pipe applied to normalized inputs. In FIG. 8, Amp is the refracted acoustic amplitude, Fcembi is the filtered cement bond index, Smfw is the sum of magnitude at the selected frequency band of WMSG waveform, Fcps is the far detector count rate from dual-spaced pulsed neutron logging tool, and Zavg is the ultrasonic average impedance. Analysis methods are not restricted to the example responses shown here. The variables shown in FIG. 8 are selected attributes that are given discrete values. The variable Amp has an index number equal to one. The variable Fcembi has an index number equal to two. The variable Smfw has an index number equal to three. The variable Fcps has an index number equal to four and the variable Zavg has an index number equal to five. The vertical axis shows the normalized magnitude for each discrete index number. The lines connecting the discrete integer index numbers connect amplitudes of each variable corresponding to the same sample.

FIGS. 9-1-9-30 show a non-limiting example of a self-organized feature map applied to clustering cement bond/annular fill logging data. All profiles of the selected 30 clusters of FIG. 7 are shown. The features of an analysis method are not restricted to the example responses shown here. FIG. 10 depicts a code image illustrating connection distances of clusters for an example classification. The 30 clusters of FIG. 7 are shown with the clusters separated by regions representing the connections of clusters. The connections of clusters can be given numerical values that reflect how close each neuron's weight vector is to its neighbors. For presentation purposes to a user, these numerical values can be converted to colors. For example, the connections of clusters can be colored from black to yellow to show how close each neuron's weight vector is to its neighbors. The significant difference can be coded with black color, while the slight difference can be coded with yellow color. Colors in between black and yellow represent difference between being significant and being slight.

Figures 1, 9:
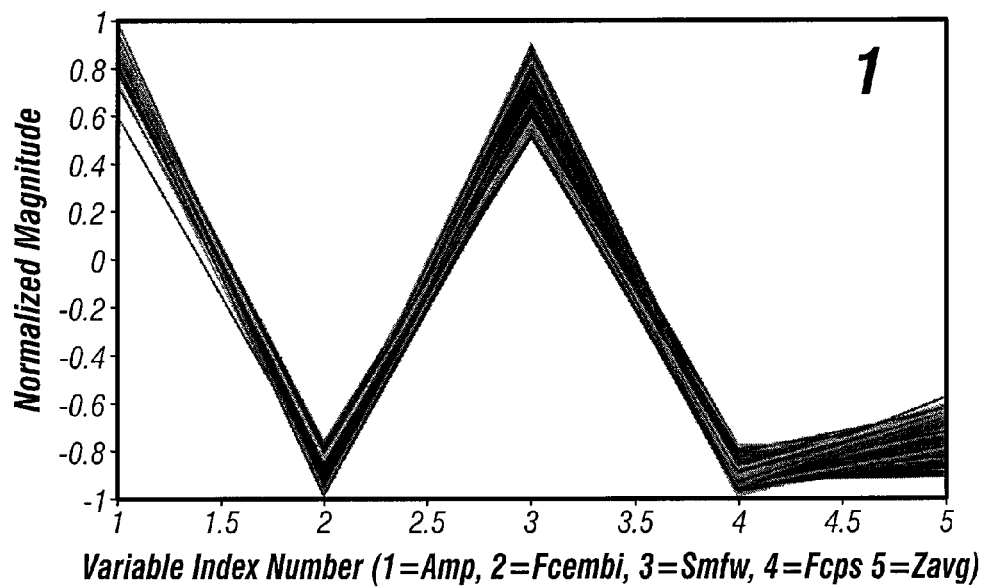
Figures 2, 9:
Figures 3, 9:
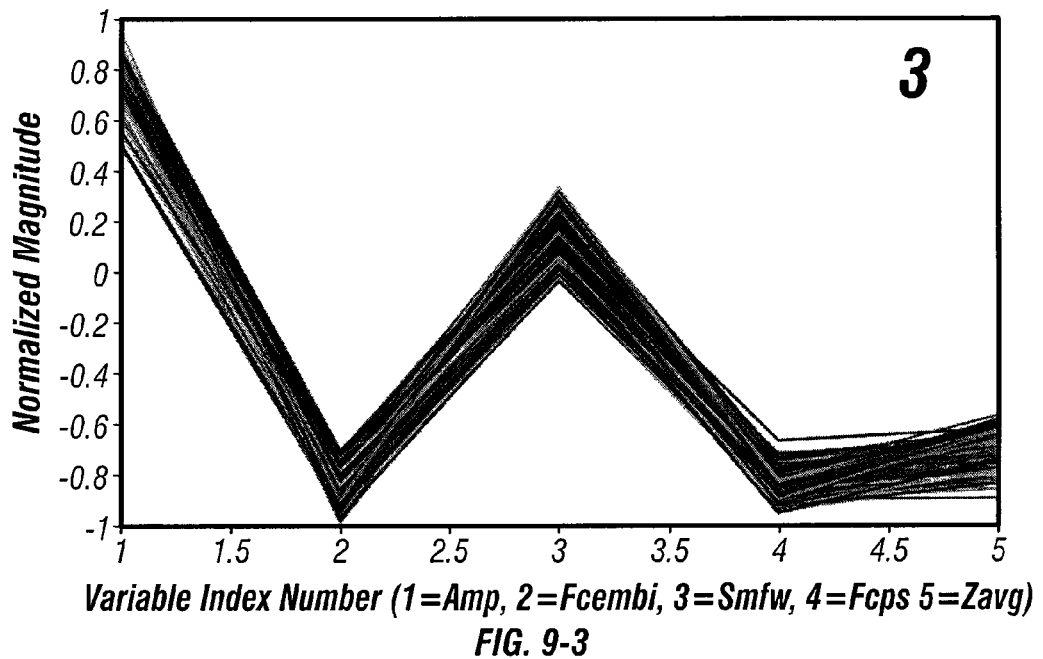
Figures 4, 9:
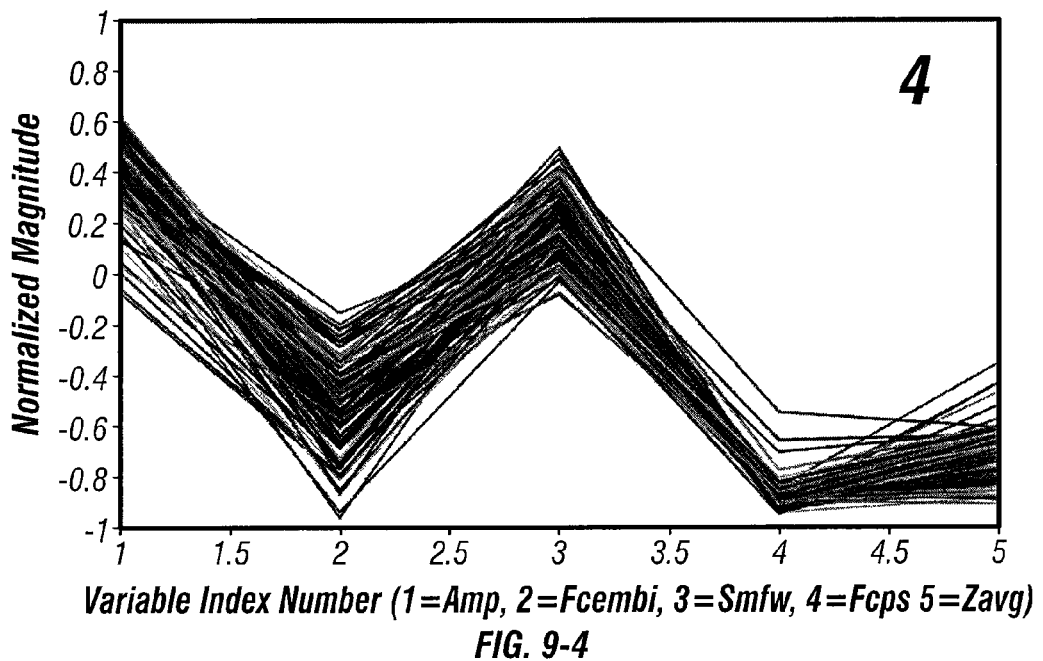
Figures 5, 9:
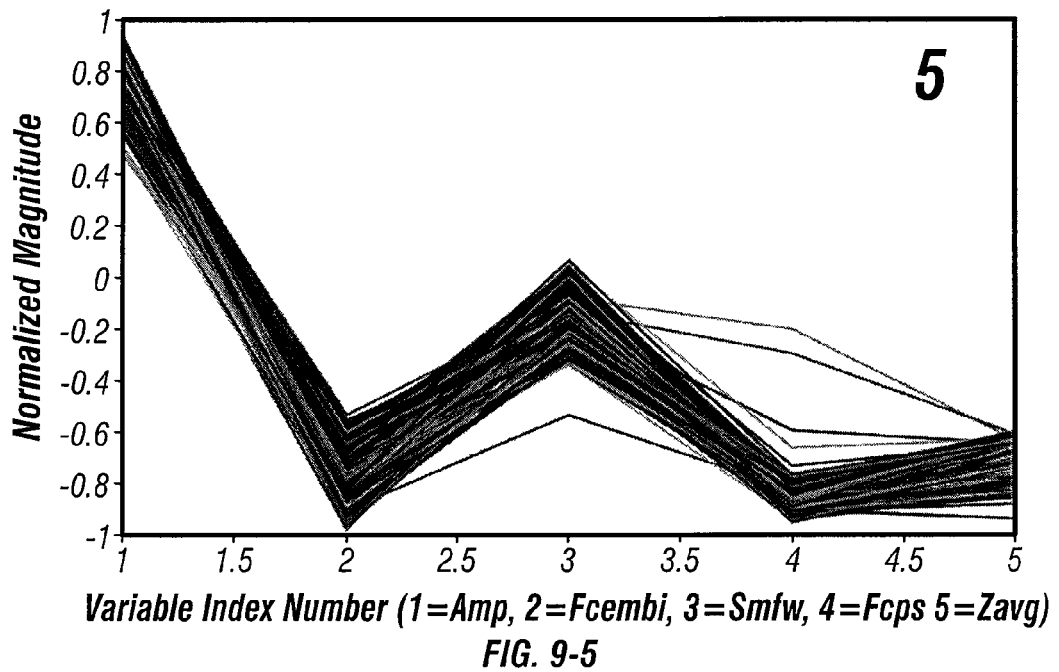
Figures 6, 9:
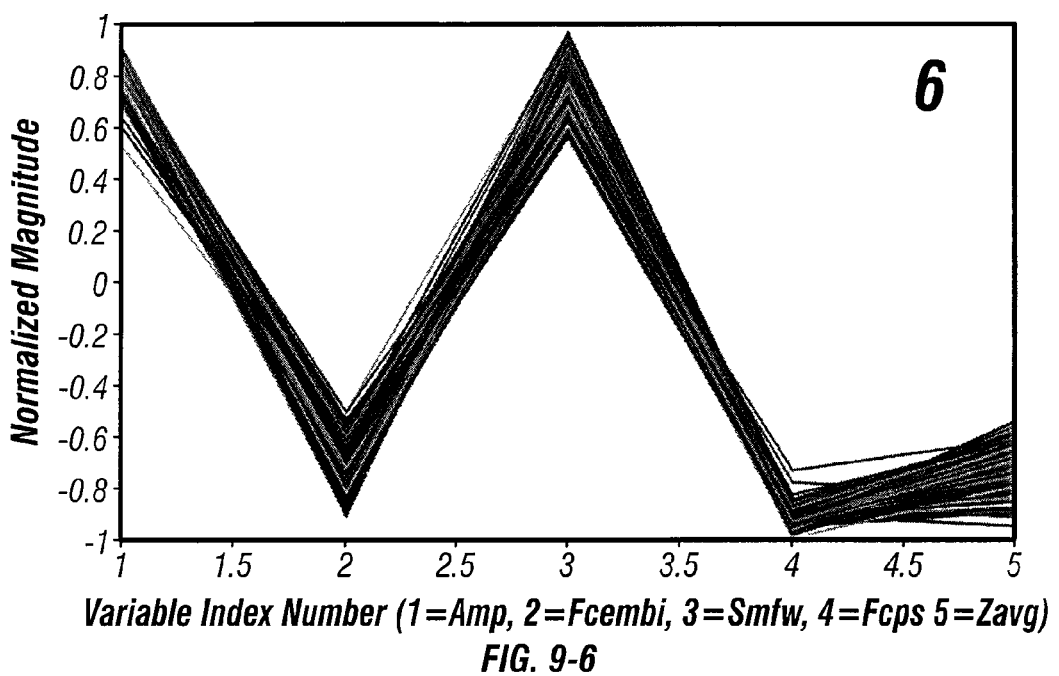
Figures 7, 9:
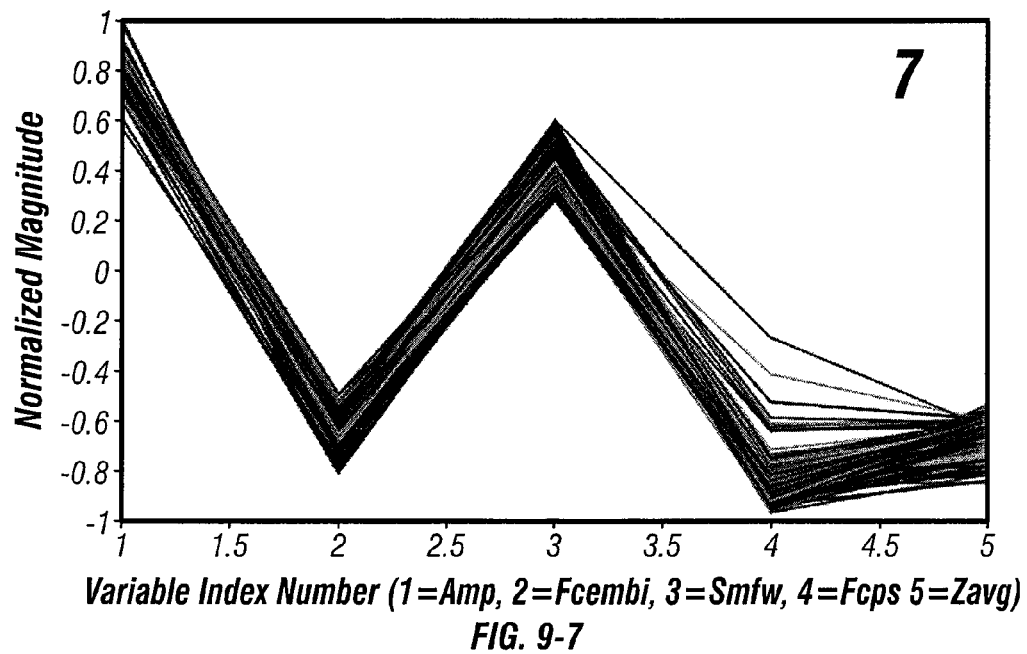
Figures 8, 9:
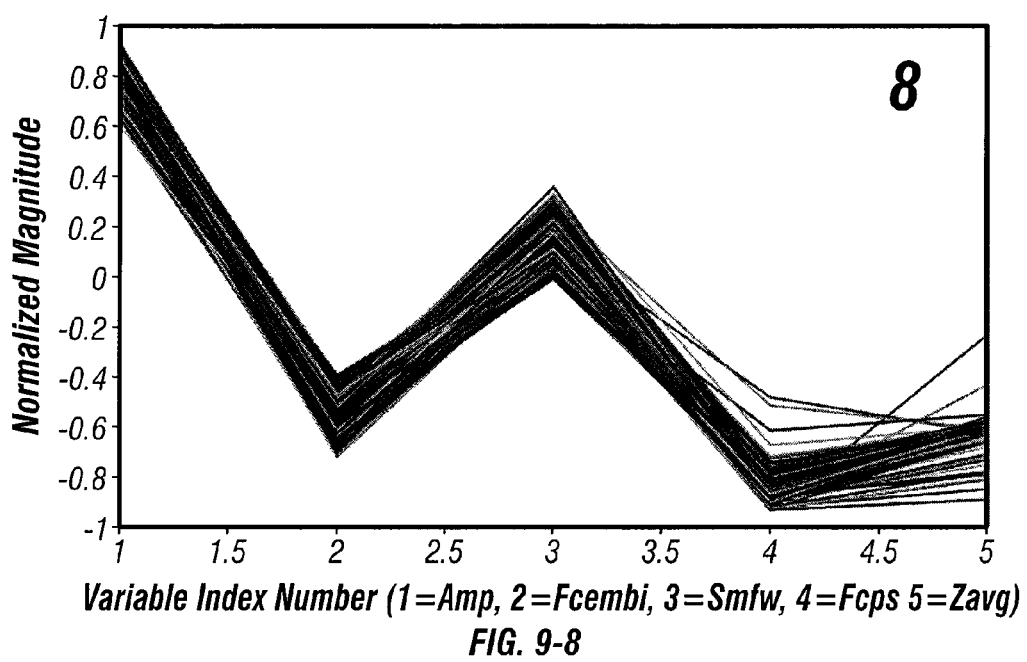
Figure 9:
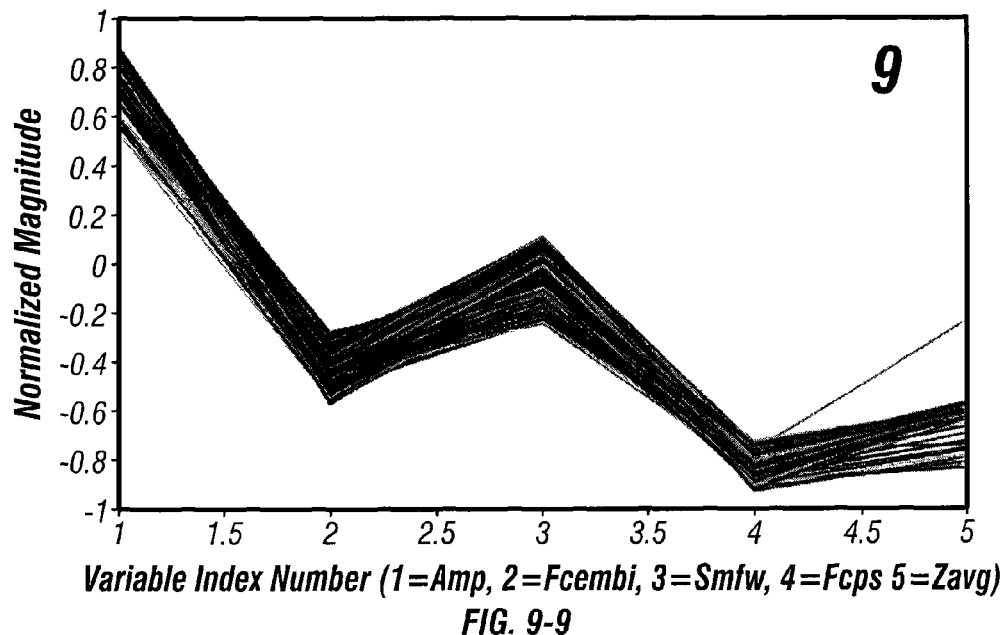
Figures 9, 10:
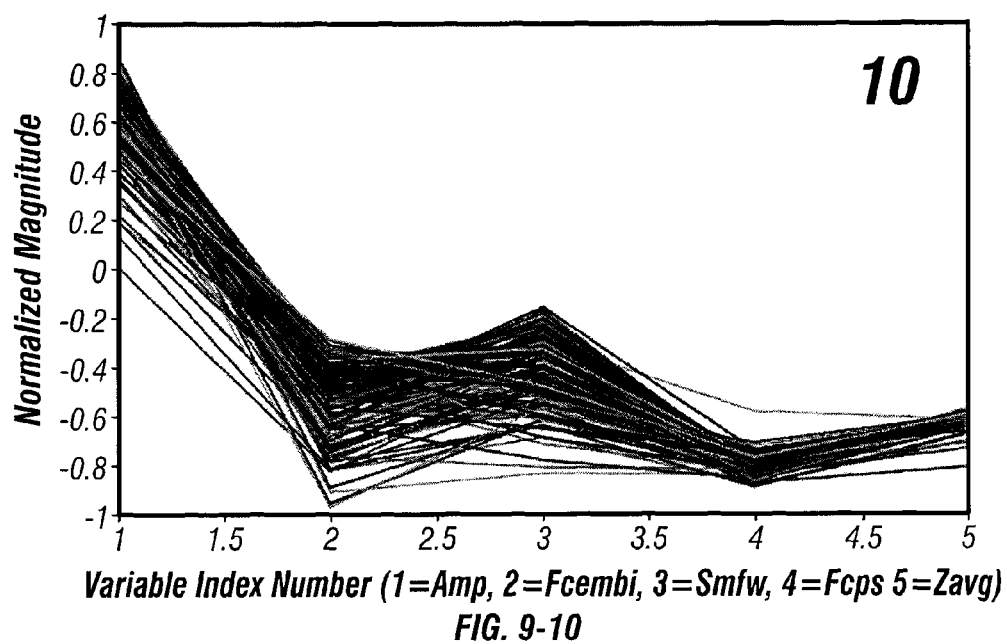
Figures 9, 10, 11:
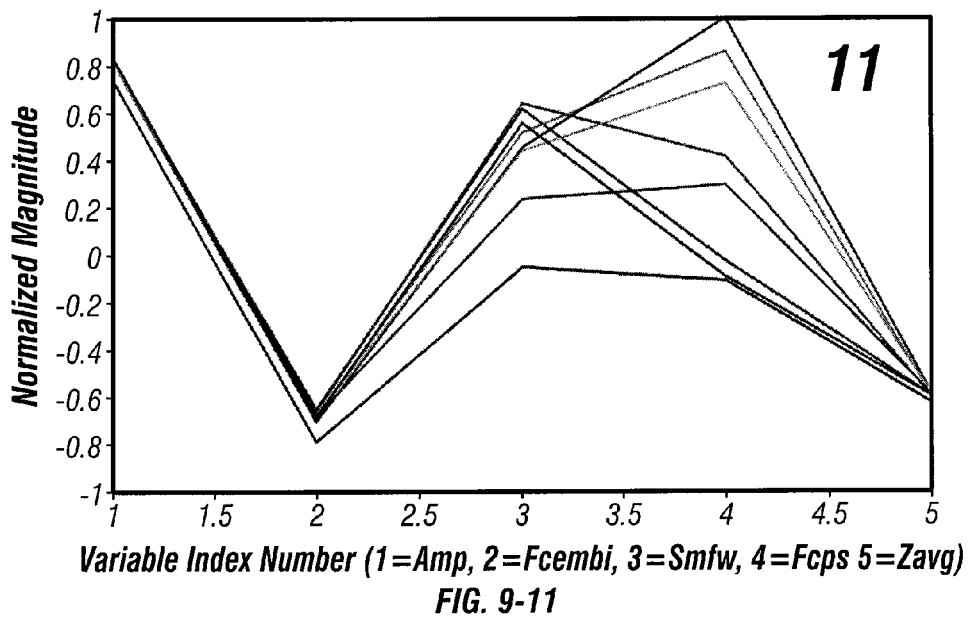

FIGS. 9-1-9-30 and FIG. 10 show that cluster 11 of FIG. 9-11, which is characterized with high Fcps, is a special pattern that is significantly different from all its surrounds. As seen in FIGS. 9-15 and 9-30, both cluster 15 and cluster 30 show profiles with wider range moving towards that of cluster 11, relative to cluster 1 for instance. FIG. 10 indicates that both cluster 15 and cluster 30 show connections with their neighbors with difference greater than being slight and can be displayed to a user as red. Cluster 15 is representative of casing collars for free pipes, and cluster 30 is a typical example of casing collars for bond or transition pipes. The fourth row (clusters 16 to 20) clusters show both similarities and differences to the clusters in the third row and the fifth row, which may be the signature of a transition pipe. SOFM results for this example can be interpreted, from lower bottom to upper top, as transition from free pipe to near-bonded pipe.

It is also observed from cluster distribution that the SOFM clustering algorithm produces near-normal distribution with respect to cluster size. This may cause problems in the cluster merger if only a small number of classes need to be finally defined, but will benefit continuous index based classification to indicate probability. As discussed below, hierarchical clustering can present a different view on the same data set.

FIG. 11 shows a hierarchical clustering applied to cement bond/annular fill logging data. A dendrogram of HC results is shown with same number of clusters (30). In the hierarchical structure, the root node represents the whole data set and each leaf node of the dendrogram is regarded as a data object. The height of the dendrogram usually expresses the distance between each pair of objects or clusters. The ultimate clustering results can be obtained by cutting the dendrogram at different levels. FIG. 11 shows leafs corresponding to a free casing collar (FCL), a transition collar (TCL), a bonded pipe casing collar (BCL), a free casing pipe (FP), a bonded casing pipe (BP), a transition pipe (TP), and a special pattern (SP). As discussed with respect to FIG. 1, pipes are connected in a pipe string using casing collars. The casing collars have different characteristics than the pipes. Cement bonding to a casing collar can differ from cement bonding to the pipes it connects.

Figures 9, 10, 11, 12:
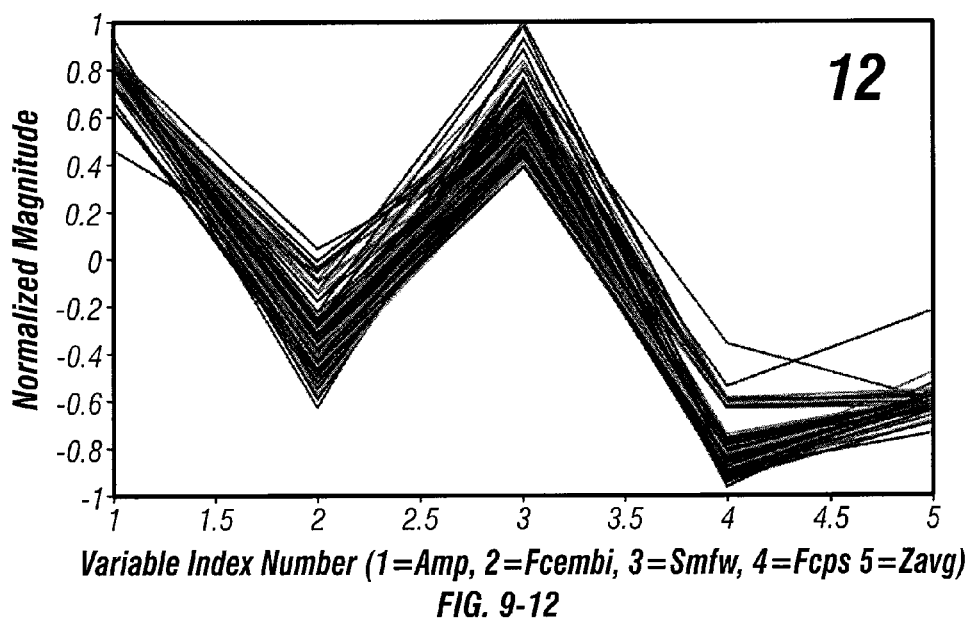

FIG. 12 shows cluster sizes indicating dominant clusters for classification. Compared to near-norm distribution of cluster size with SOFM in this example, six major clusters with hierarchical clustering, as shown in FIG. 12, are filled with more than 95% percent of samples. Dealing with a small number of major clusters can be advantageous because classification becomes relatively straightforward. However, a high error rate might exhibit if the final decision is misled due to low resolution or information loss within/among the major clusters. Since different algorithms form different clusters for the same data set, a solution method would include a mechanism to evaluate the quality of generated clusters, to determine the cluster merge strategy, and to refine and interpret the integrated solution.

Figures 9, 10, 11, 12, 13:
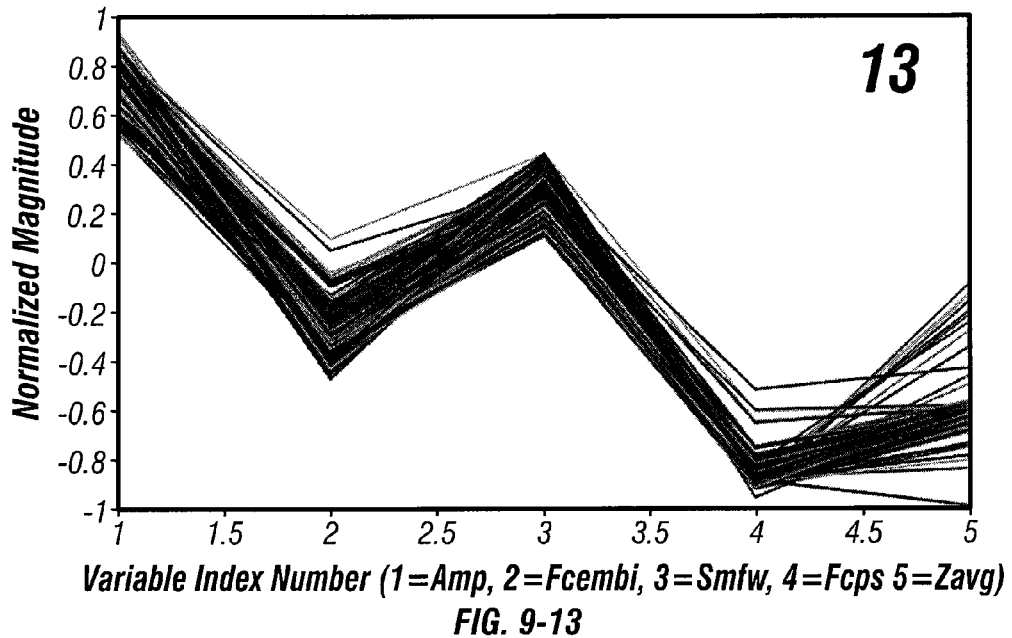
Figures 9, 10, 11, 12, 13, 14:
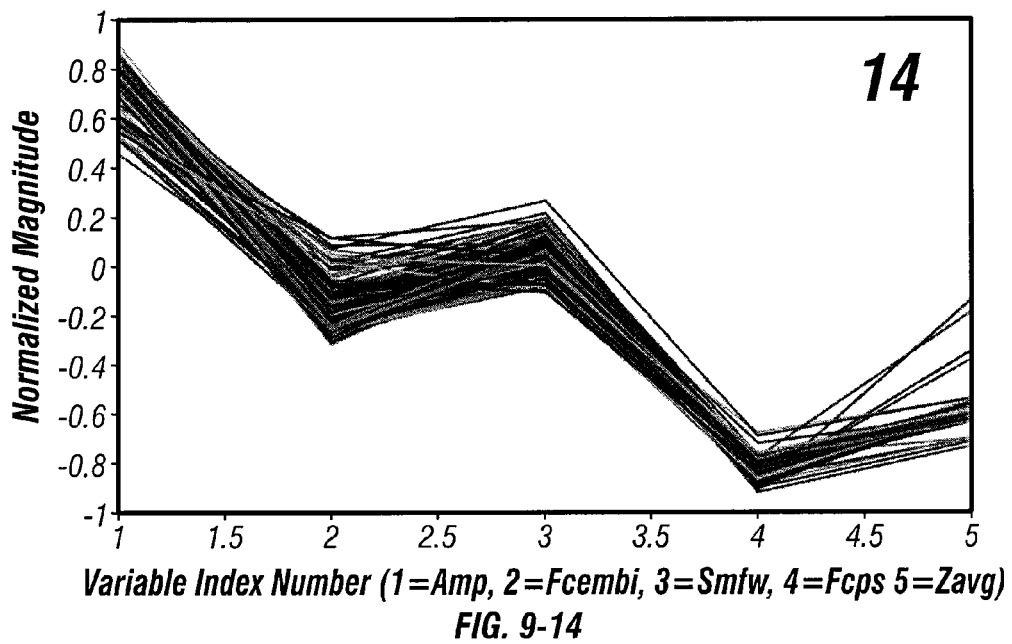

To evaluate the quality of clusters, one can examine the centroid vectors of clusters generated with different methods. Using the SOFM algorithm, the cluster centroid vectors are the weighting vectors of each neuron, which can be obtained after training the competitive network. Using the HC algorithm, the samples in each cluster can be averaged over each input (dimension) respectively to form the cluster centroid vector. FIG. 13 shows a non-limiting example of weighting vectors of clusters with a SOFM. The weighting vectors presented are all 30 resulting vectors of the example. Analysis methods are not restricted to the example responses shown here. FIG. 14 shows a non-limiting example of centroid vectors of clusters with HC. The weighting vectors presented are all 30 resulting vectors of the example. Analysis methods are not restricted to the example responses shown here.

From FIGS. 13 and 14, it can be seen that the HC vectors distribute over wider dynamic data range in each dimension than SOFM vectors, especially for dimension 1, 4, and 5, where the dimension is the attribute correlated to the measurement tool. Because HC vectors actually represent the cluster centers, HC clusters can be chosen as basis for merger. Automatic merger can take secondary clustering applied to the centroid vectors, and can set the number of clusters to be the same as the number of final classes specified. Merger based on user preference can be used to consider the similarity of the cluster profiles, the connection distance among the primary clusters, and additional criteria that may not be apparent to the clustering algorithms. The cluster merger can also use expert indicated signatures to guide the cluster merger. Disagreement between knowledge based suggestions and natural grouping of the clustering process may provide an indication to use additional information, to apply different scales or normalization, or to try other distance measure in clustering.

Classification using WRF can provide a mechanism to capture an analyst's interpretation knowledge into a function, which varies from 0, "bound pipe response", to 1, "free pipe response". Through experience, an analyst has an expectation of the values of attributes as a function of borehole size, casing weight, annular fill, cement type, and other factors. For example, from experience, a analyst may have an expectation, for given circumstances, of the values of CBL amplitude, AMP, ultrasonic impedance, ZAVG, pulsed neutron far detector count rate, FCPS, pulsed neutron near detector count rate, NCPS, and filtered cement bond index, FCEMBI, for bound pipe response and for free pipe response.

Figures 9, 10, 11, 12, 13, 14, 15:
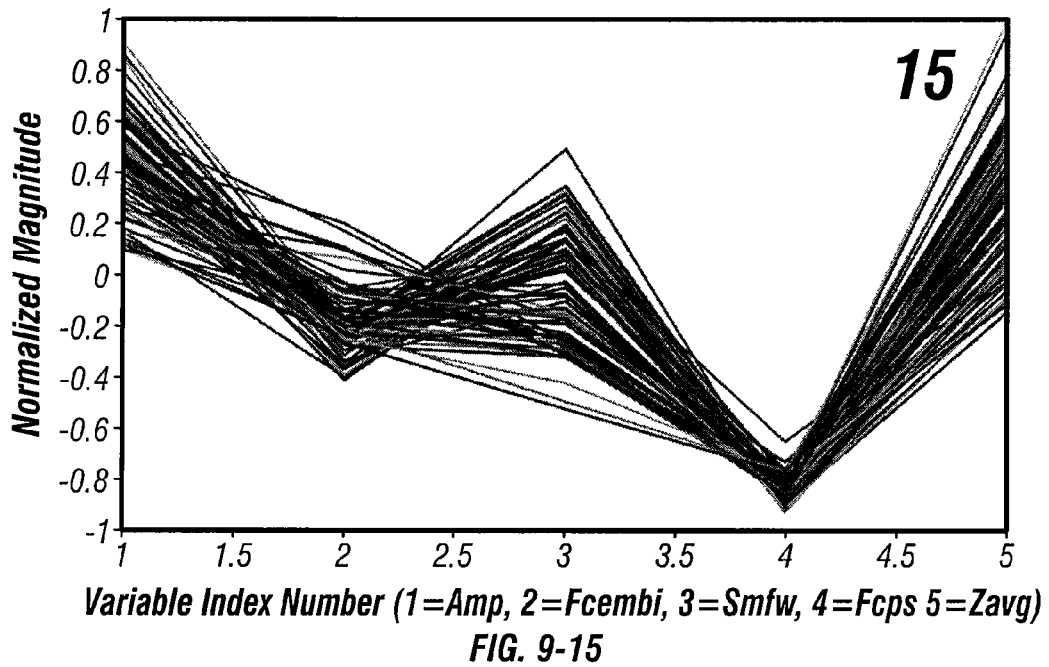

FIG. 15 shows cross plots of some variables, where typical values for bound pipe response and typical values for free pipe response are indicated. Different values can correspond to bound pipe response and free pipe response. A bound pipe response is indicated by dot 1520 and a free pipe response is indicated by 1510. In a display for a user, solid red dots can represent typical values for bound pipe response and solid green dots can represent typical values for free pipe response. FIG. 15 shows a series of cross plots, which indicate the relationship of each variable ZAVG, FCPS, NCPS, and FCEMBI with the variable AMP. The dots having the same numerical value, shown in a color display as the same color, are indexed to the sample depth having the same numerical value, or same color on a color display.

Each variable can be normalized to a range [0, 1] by applying a transform such as but not limited to:

$$\text{variable}_x = \text{normalized\_variable} = \frac{\text{variable} - \text{variable\_bound}}{\text{variable\_free} - \text{variable\_bound}}$$

Figures 9, 10, 11, 12, 13, 14, 15, 16:
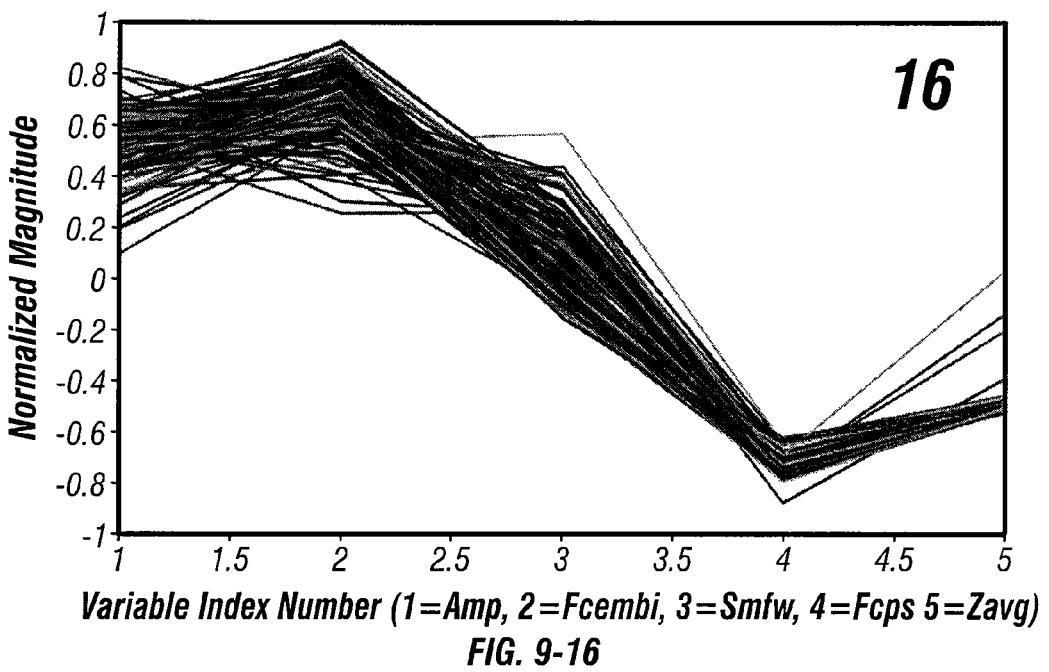

FIG. 16 shows the results of performing this normalizing transform with respect to cross plots of variables from FIG. 15. A value of one suggests a strong likelihood of free pipe and a value of zero suggests a strong likelihood of bound pipe. Though this discussion has considered 5 variables, less than 5 or more than 5 variables can be used. Using the normalized variables, a free pipe index can be defined. For example, a free pipe index can be defined by taking the average or weighted average of the individual transformed variables:

$$\text{free\_pipe\_index} = \frac{\text{amp}_x + z \text{avg}_x + f \text{cps}_x + n \text{cps}_x + f \text{cembi}_x}{5}$$

Additional variables, obtained as attributes from acquired waveforms as previously discussed, can be included in this process, where the additional variables are also normalized and the denominator is set to the total number of variables.

Figures 9, 10, 11, 12, 13, 14, 15, 16, 17:
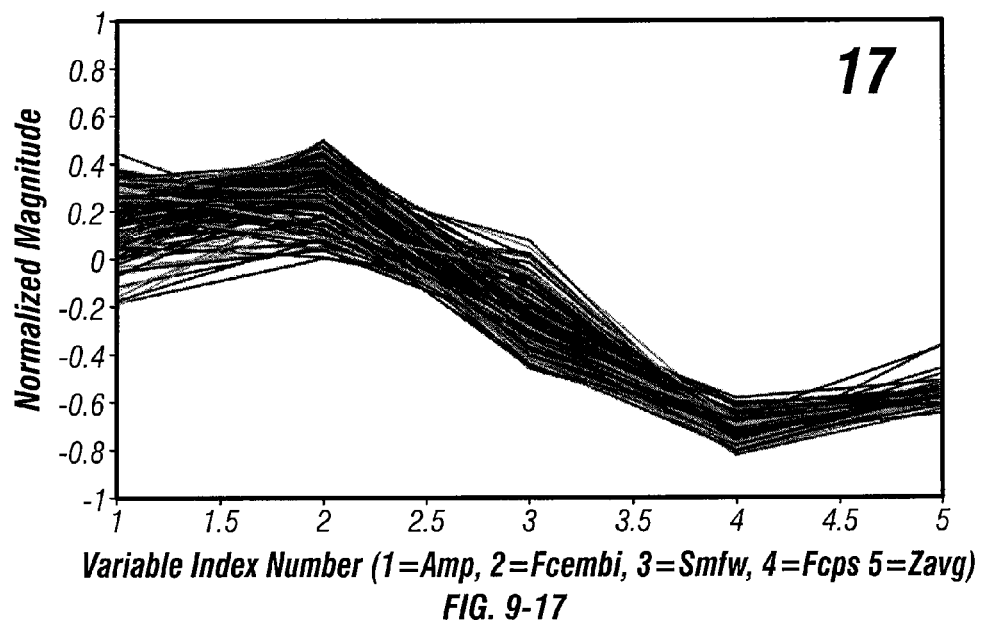

FIG. 17 shows results from a typical well. The closer the free pipe index is to one, the more likely the possibility that the status of the pipe is that of a free pipe, and the closer the free pipe index to zero, the more likely the possibility the status of the pipe is that of a bound pipe.

In various embodiments, a clustering based approach is directed to determining intrinsic clusters from the depth-based data and from the features extracted from the waveforms of various measurement tools. This automatic clustering approach ensures that no patterns are omitted by an analyst assigning to a particular class such as free pipe, transitional pipe, bound pipe, etc. This approach can be viewed as a top down approach.

In various embodiments, the automated classification based approach seeks to capture knowledge of an interpreter into an algorithm. This can be accomplished through the use of crossplots and parameter settings that can be selected by the analyst. The resulting classification, free-pipe, bound-pipe, or neither can be viewed as an analyst driven, bottoms up approach, which is directed to incorporating the local knowledge of the interpreter into an algorithm.

Both the clustering and classification techniques are explicit and can be completely under control of an interpreter. This control can be manifested by using a user interface to set parameters and by using electronic storage devices to maintain information related to cement bonding and/or annular material characteristics from previous wells. For both the clustering and classification techniques, transforming the waveform data to one or more attributes provides a unique mechanism to analysis the cement bonding and/or annular material classification profile of a pipe in a borehole.

Figures 9, 10, 11, 12, 13, 14, 15, 16, 17, 18:
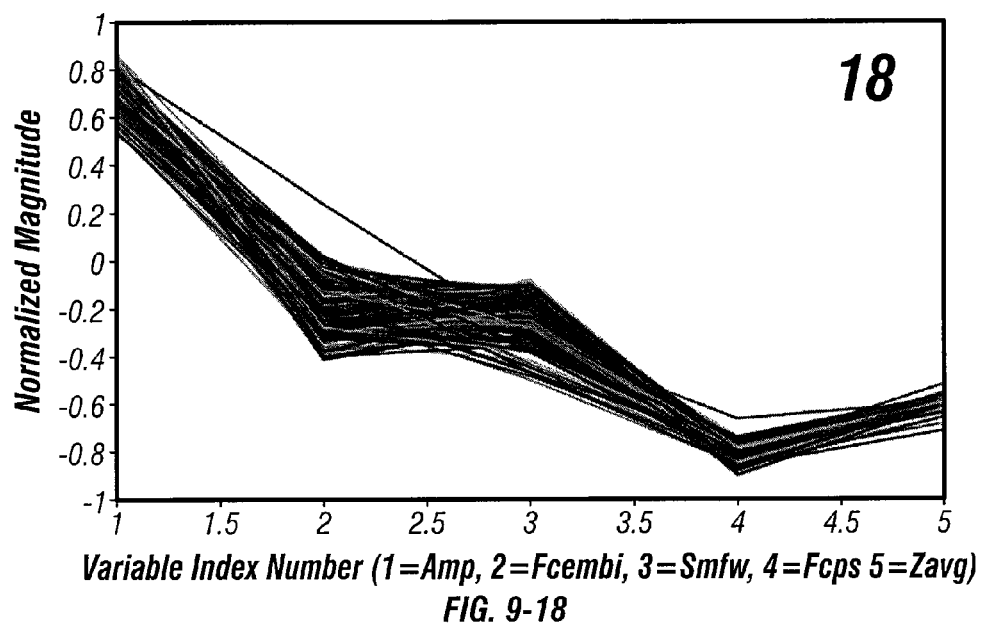
Figures 9, 10, 11, 12, 13, 14, 15, 16, 17, 18, 19:
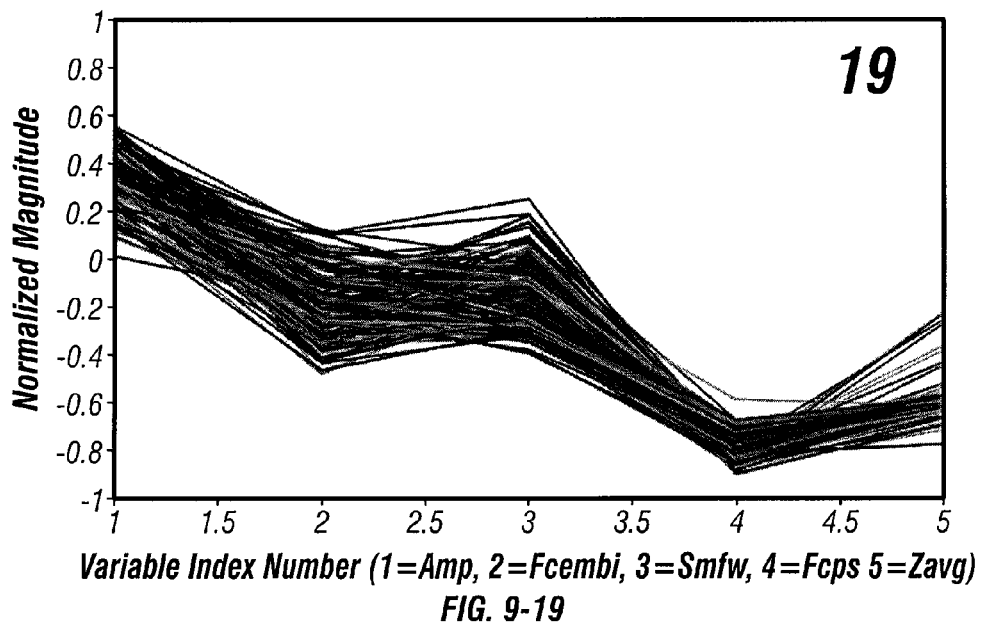
Figures 9, 10, 11, 12, 13, 14, 15, 16, 17, 18, 19, 20:
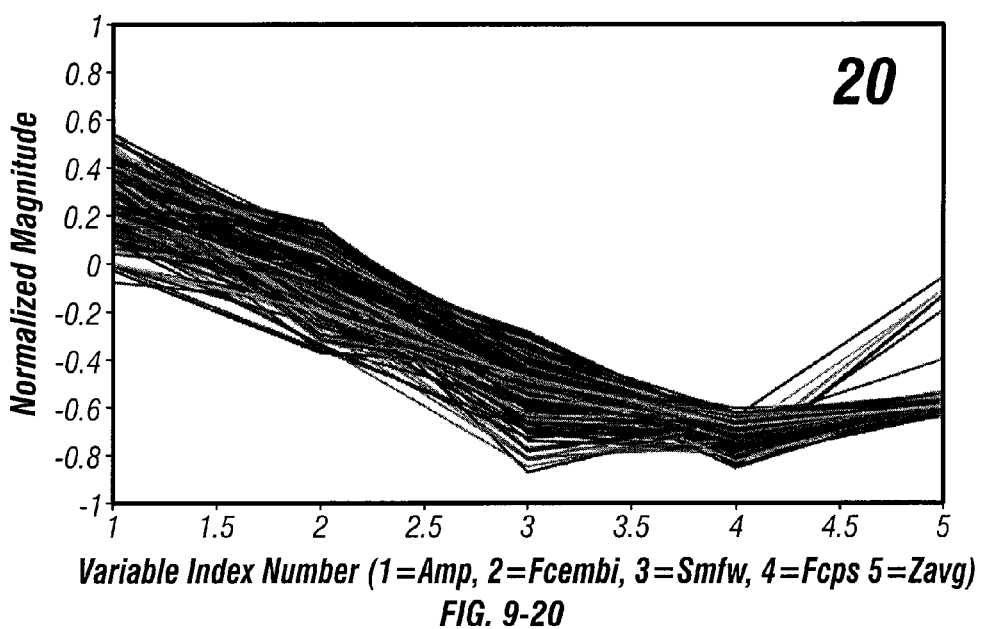
Figures 9, 10, 11, 12, 13, 14, 15, 16, 17, 18, 19, 20, 21:
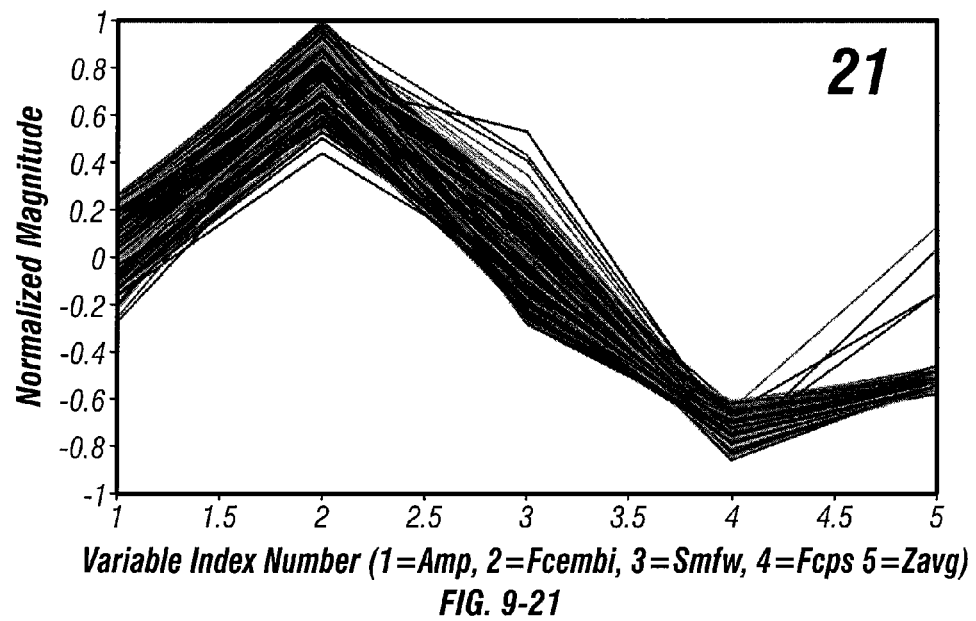
Figures 9, 10, 11, 12, 13, 14, 15, 16, 17, 18, 19, 20, 21, 22:
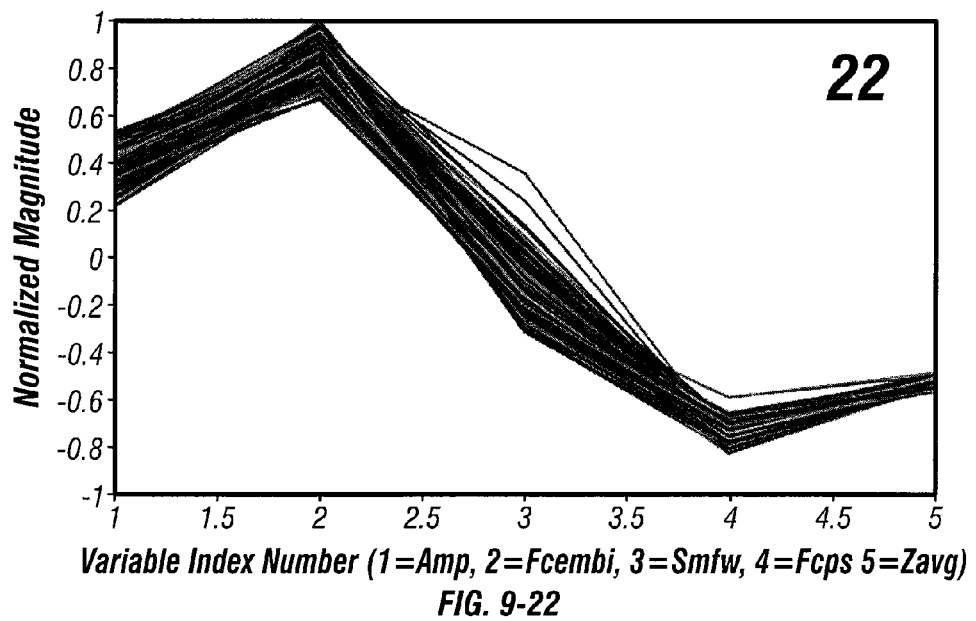
Figures 9, 10, 11, 12, 13, 14, 15, 16, 17, 18, 19, 20, 21, 22, 23:
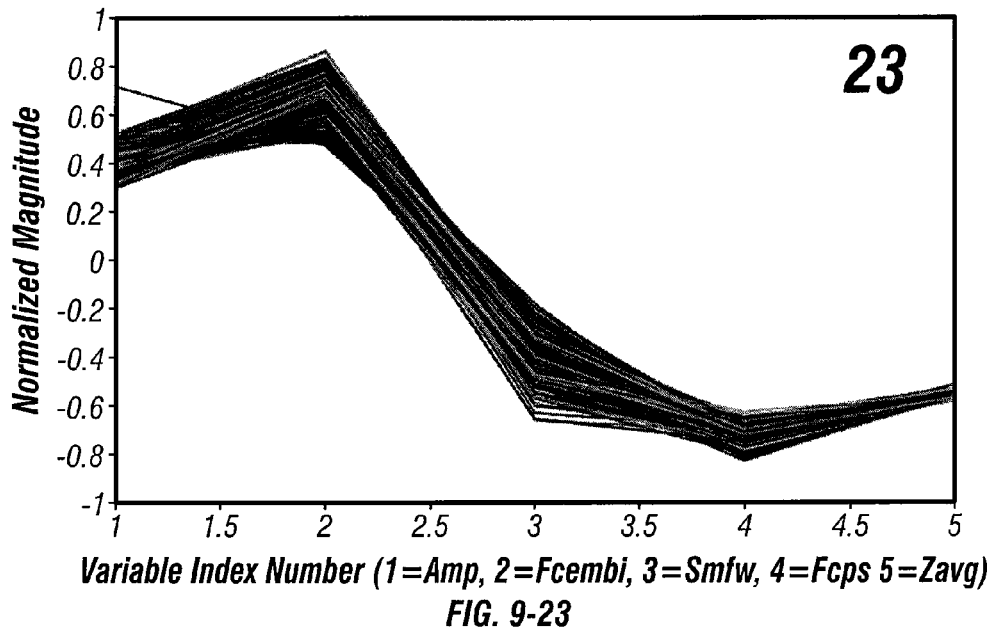
Figures 9, 10, 11, 12, 13, 14, 15, 16, 17, 18, 19, 20, 21, 22, 23, 24:
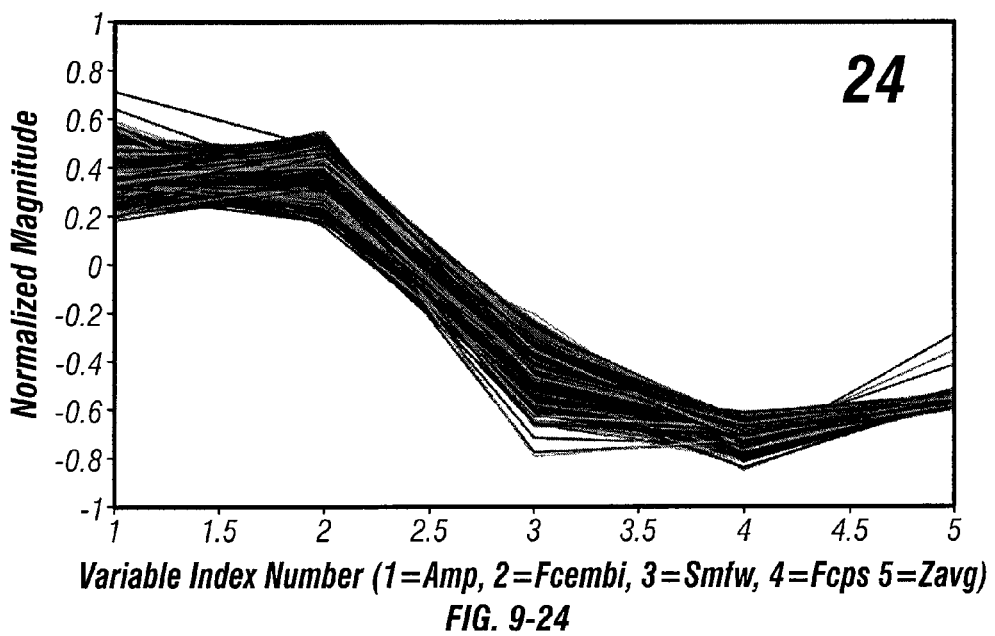
Figures 9, 10, 11, 12, 13, 14, 15, 16, 17, 18, 19, 20, 21, 22, 23, 24, 25:
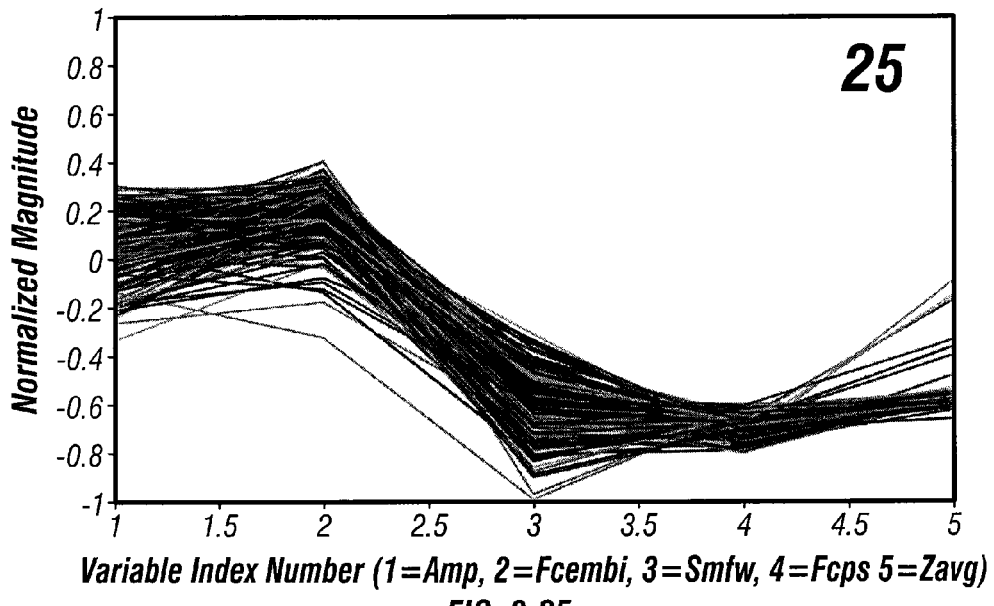
Figures 9, 10, 11, 12, 13, 14, 15, 16, 17, 18, 19, 20, 21, 22, 23, 24, 25, 26:
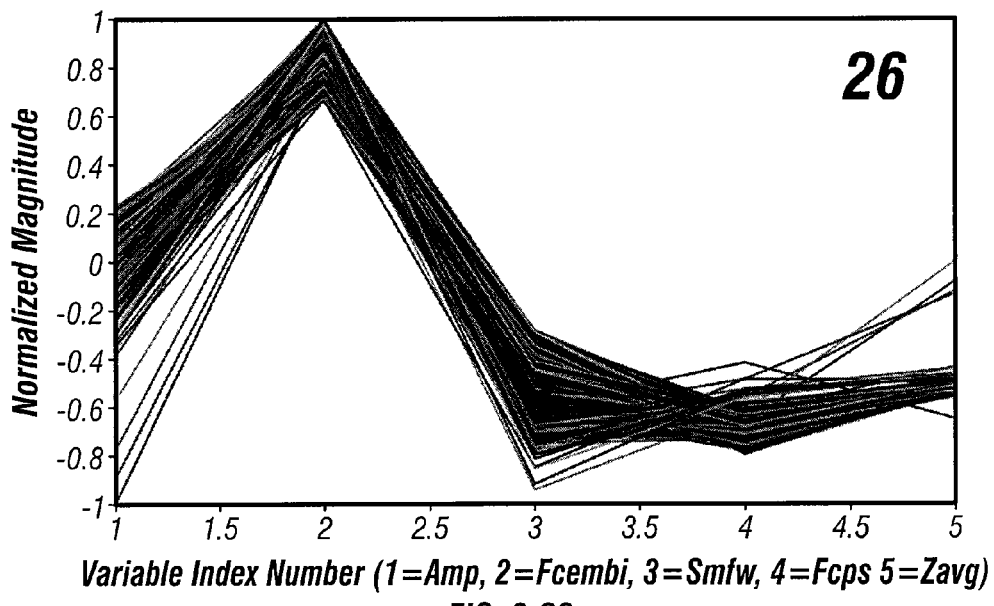
Figures 9, 10, 11, 12, 13, 14, 15, 16, 17, 18, 19, 20, 21, 22, 23, 24, 25, 26, 27:
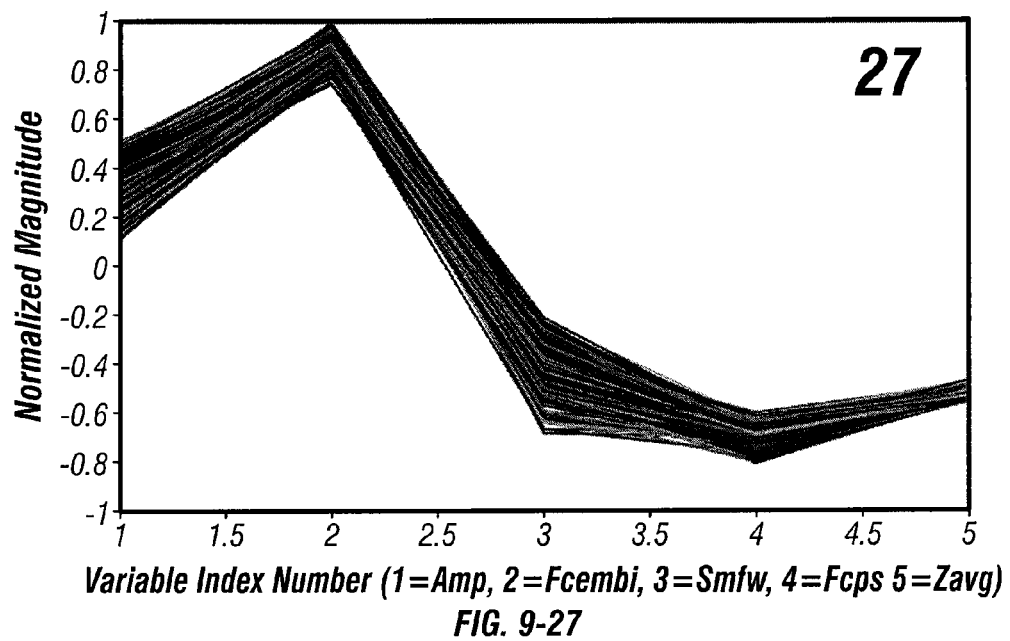
Figures 9, 10, 11, 12, 13, 14, 15, 16, 17, 18, 19, 20, 21, 22, 23, 24, 25, 26, 27, 28:
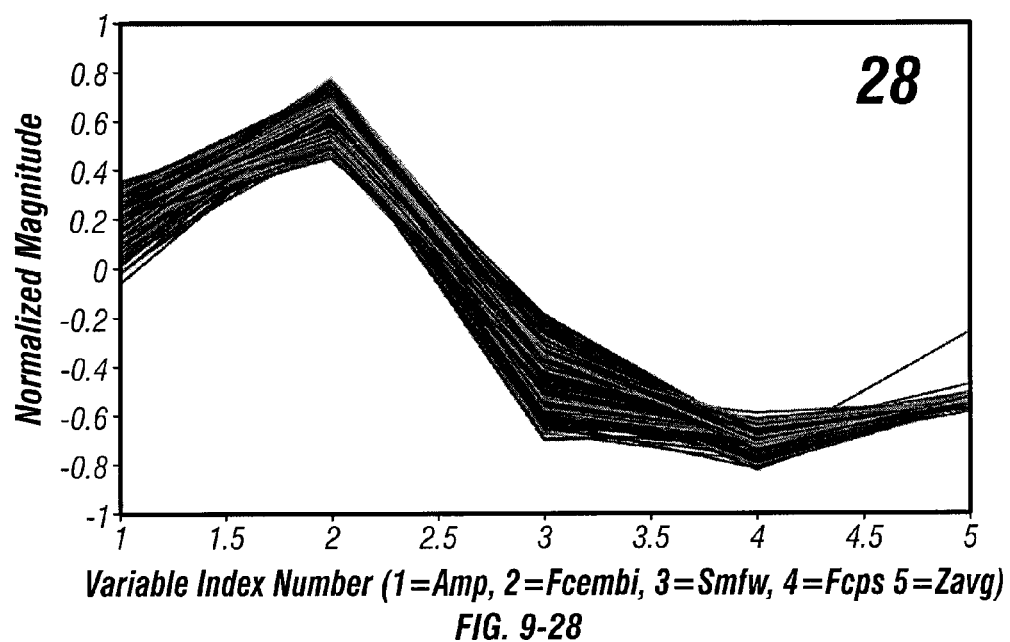
Figures 9, 10, 11, 12, 13, 14, 15, 16, 17, 18, 19, 20, 21, 22, 23, 24, 25, 26, 27, 28, 29:
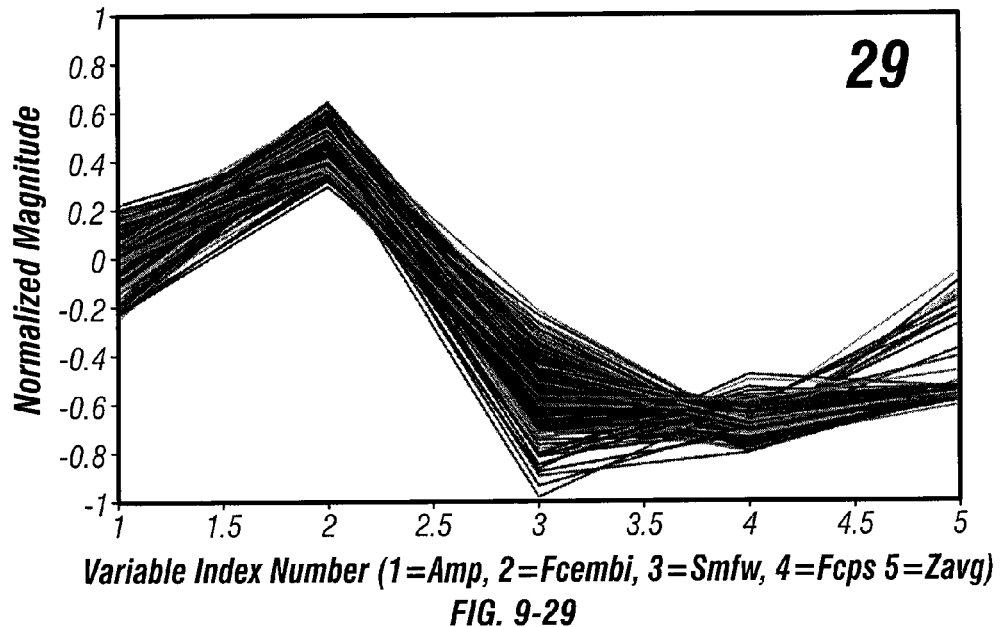
Figures 9, 10, 11, 12, 13, 14, 15, 16, 17, 18, 19, 20, 21, 22, 23, 24, 25, 26, 27, 28, 29, 30:
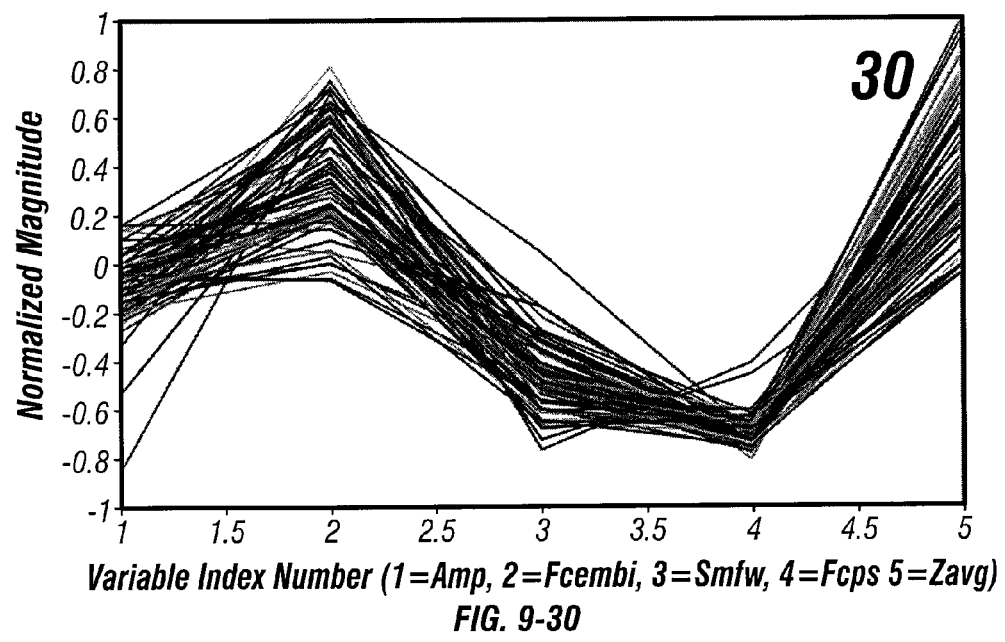
Figure 10:
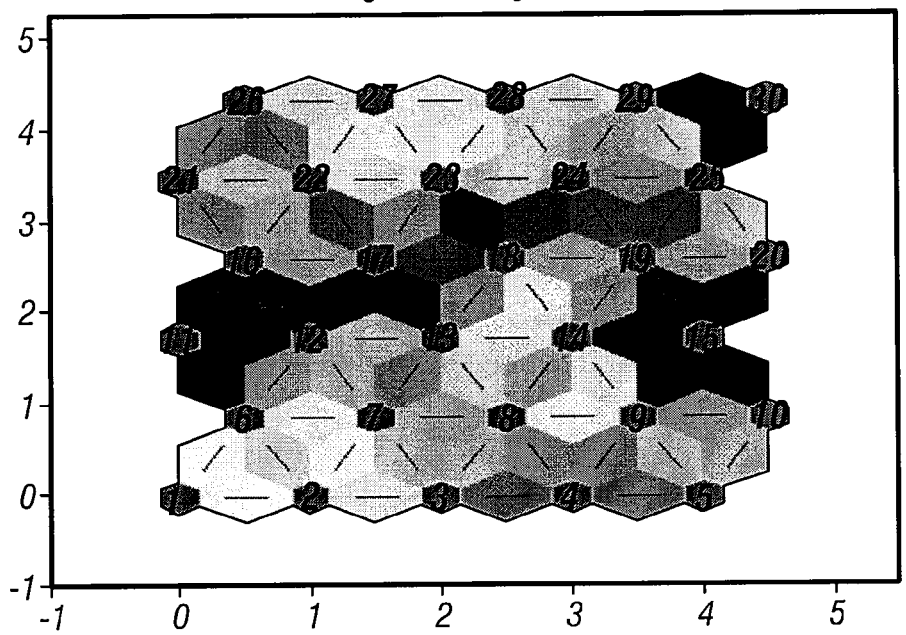
Figure 11:
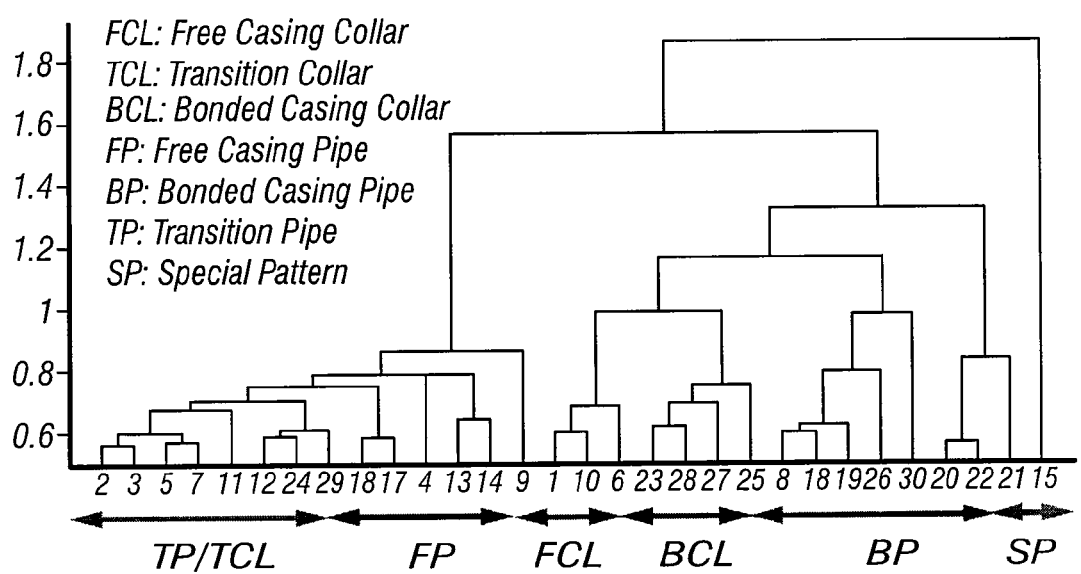
Figure 13:
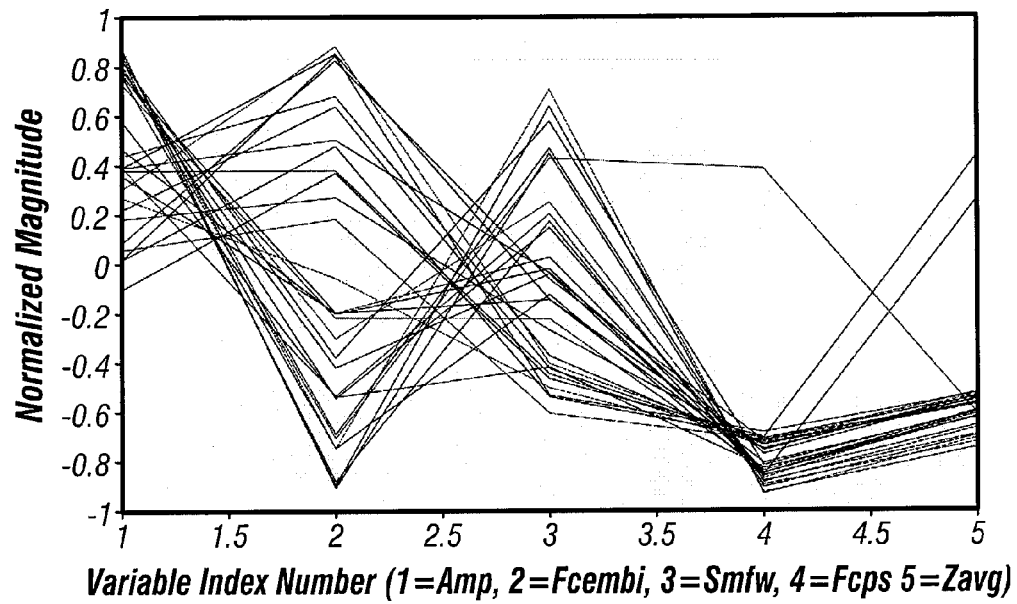
Figure 14:
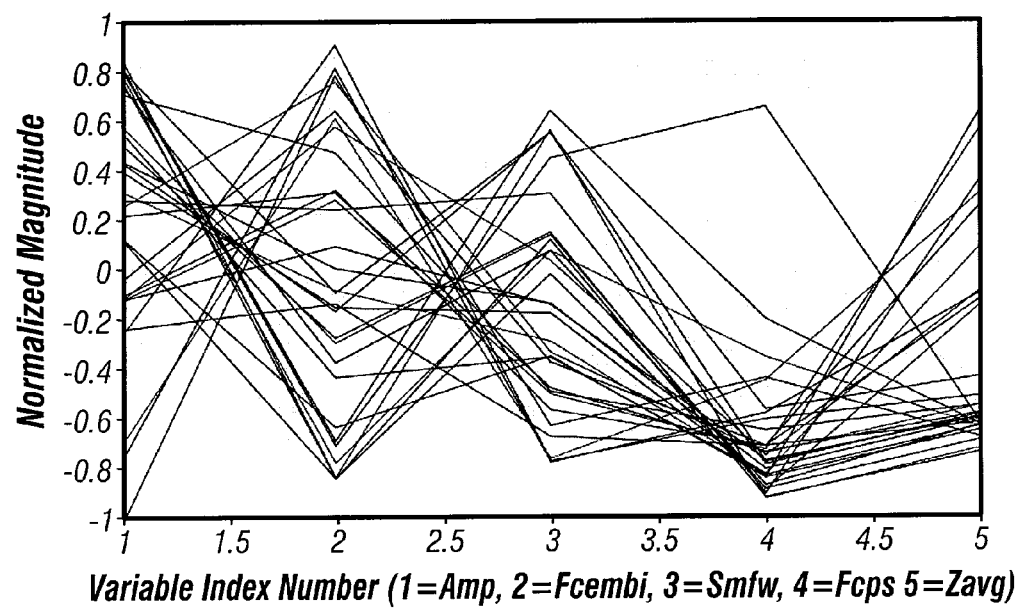
Figure 15:
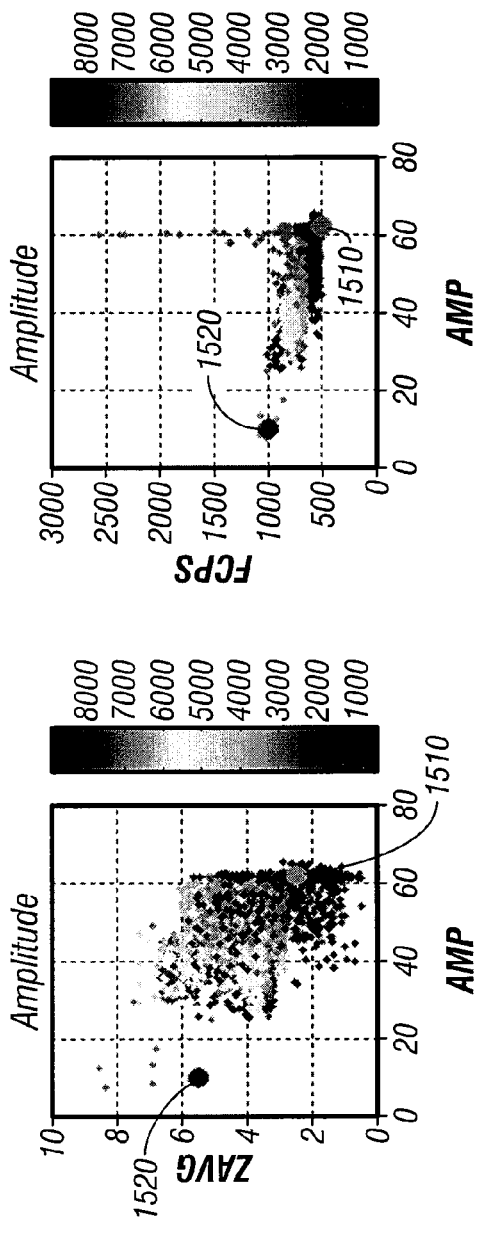
Figure 15:
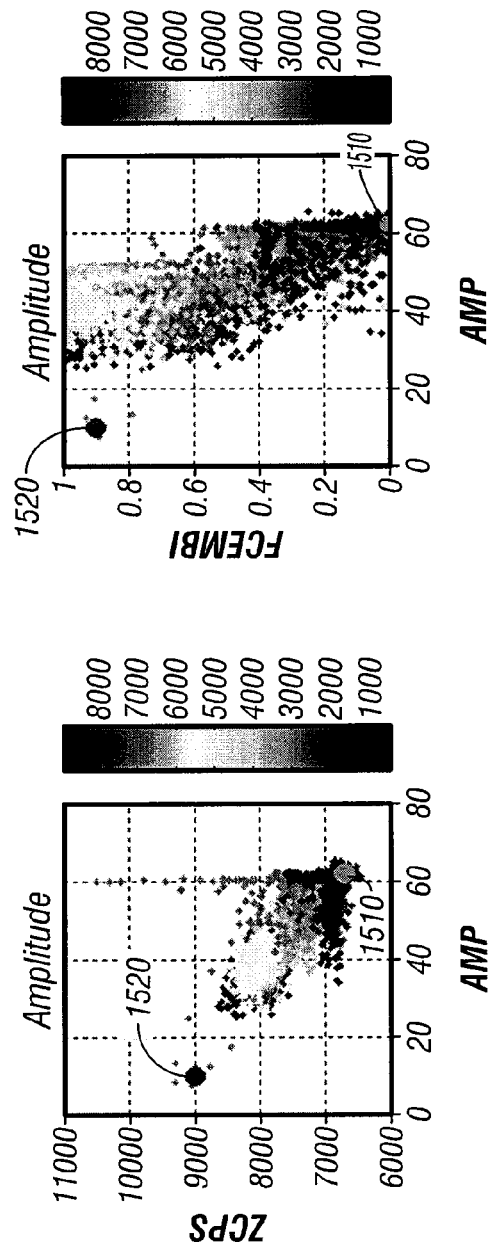
Figure 16:
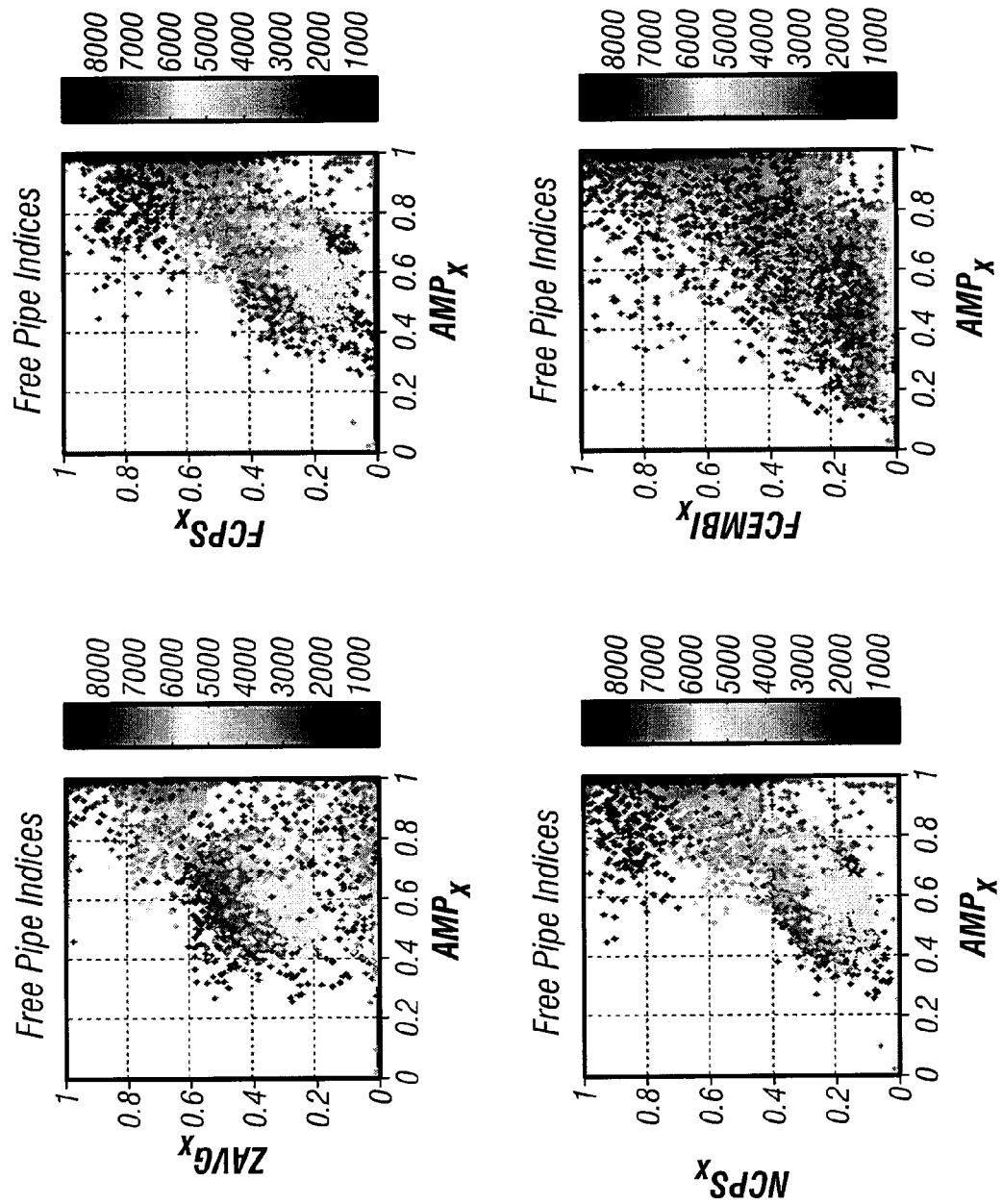
Figure 17:
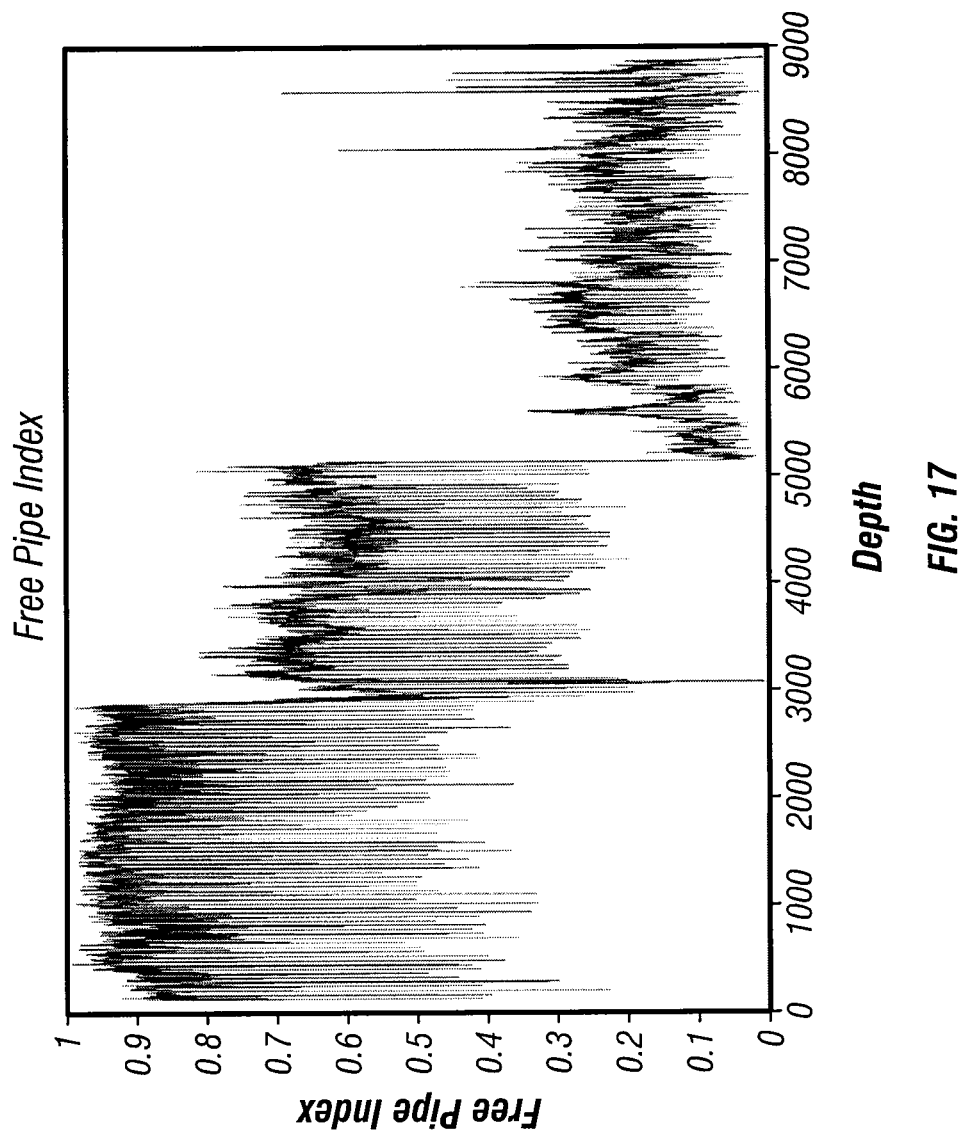
Figure 18:
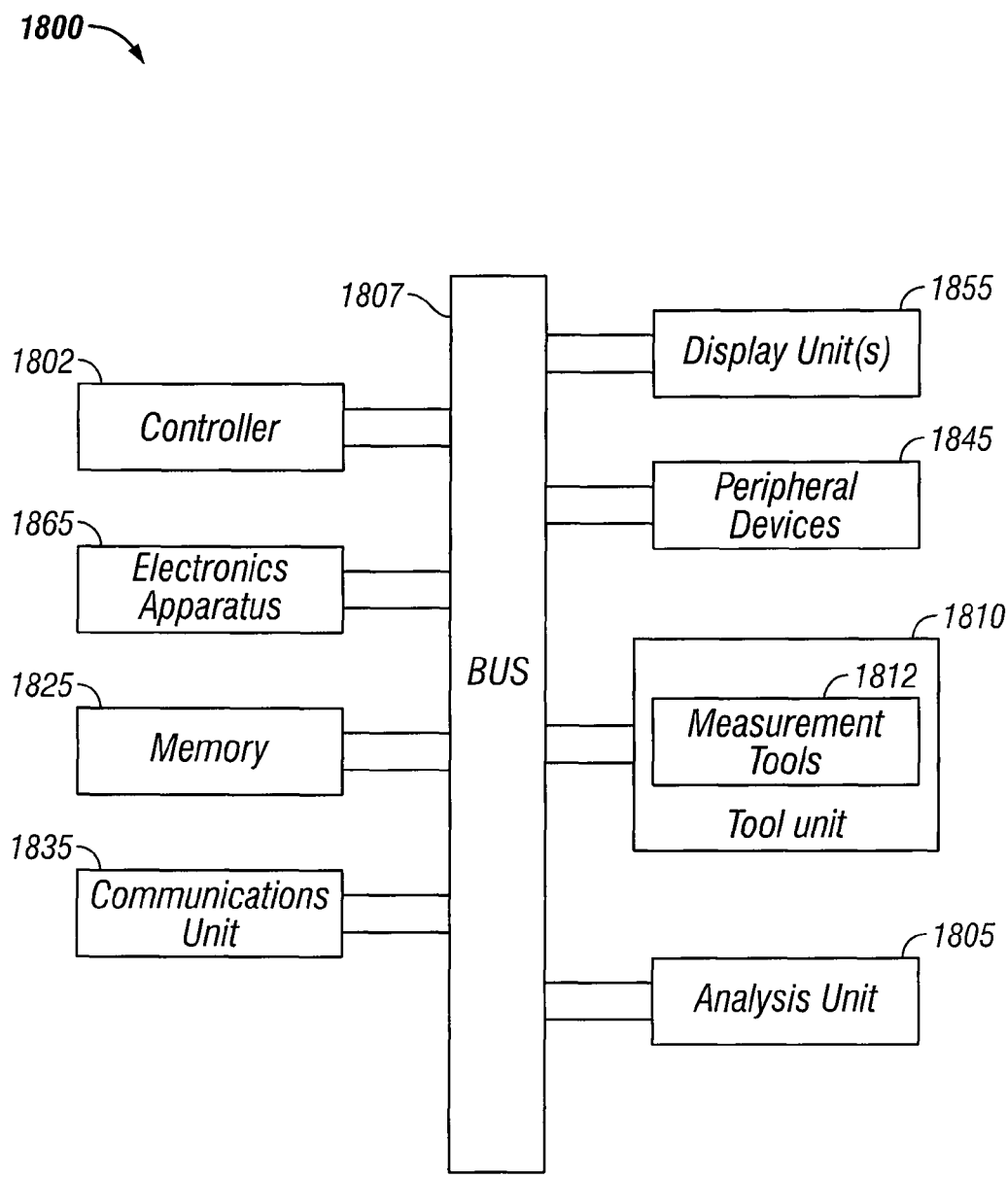

FIG. 18 depicts a block diagram of features of an example embodiment of a system 1800 having components to analyze measurement data from a tool unit 1810. System 1800 can be directed to cement bond/annular fill analysis with respect to a pipe in a borehole. The cement bond/annular fill analysis can include cement bond/annular fill clustering and classification methods. System 1800 includes instrumentality to retrieve sensor measurement values and waveforms from logging data, to extract feature information from the waveforms or sensors, and to perform clustering and classification. Tool unit 1810 can include one or more measurement tools 1812 operable with respect to a pipe disposed in a borehole. Measurement tools 1812 provide waveforms or other responses that can be acquired by operation of a controller 1802. System 1800 can operate in accordance with procedures similar or identical to procedures associated with FIGS. 1-17.

System 1800 can include, in addition to controller 1802 and tool unit 1810, a memory 1825, an electronic apparatus 1865, and a communications unit 1835. Controller 1802, memory 1825, and communications unit 1835 can be arranged to operate as a processing unit to control cement bond/annular fill analysis including, but not limited to, retrieval of measurement values and waveforms from logging data, extraction of feature information from the waveforms, and to perform clustering and classification activation on the extracted feature information. An analysis unit, to engage in processing data to conduct cement bond/annular fill analysis, can be distributed among the components of system 1800 including electronic apparatus 1865. Alternatively, system 1800 can include an analysis unit 1805 to conduct cement bond/annular fill analysis. Analysis unit 1805 can include a processor and may operate with controller 1802 to perform cement bond/annular fill analysis. Controller 1802 can be realized as one or more processors. The one or more processors can be arranged as a group of processors that may operate independently depending on an assigned function. Analysis unit 1805 may be coupled to controller 1802 by a bus 1807.

Bus 1807 provides electrical conductivity among the components of system 1800. Bus 1807 can include an address bus, a data bus, and a control bus, each independently configured. Bus 1807 can be realized using a number of different communication mediums that allows for the distribution of components of system 1800. Use of bus 1807 can be regulated by controller 1802. Bus 1807 may include a communication vehicle to operate tool unit 1810 in a borehole. Bus 1807 can be arranged as part of a network such that a memory unit located on the network can store the waveform or sensor data generated by tool unit 1810 and/or store data providing characteristics of pipe-cement bonding and/or annular material characterization at various status ranging from free pipe to bound pipe.

In various embodiments, display unit(s) 1855 can provide a display unit for a user interface to provide a mechanism for a user to set parameters for cement bond/annular fill analysis according to user preference or knowledge. Display unit 1855 can also include screens for a user to view operation of the cement bond/annular fill analysis at various stages of the procedure. Display unit 1855 can include printers to output information correlated to status of cement bond/annular fill of the pipe in the borehole. Peripheral devices 1845 can include additional displays, additional storage memory, and/or other control devices that may operate in conjunction with controller 1802 and/or memory 1825.

In various embodiments, apparatus and methods of cement bond/annular fill analysis can combine unsupervised and supervised (or semi-supervised) classification. As an analytical approach, unsupervised classification with the use of clustering algorithms has the potential to reveal hidden data structure in data measurements, and create a set of natural patterns in different resolutions with respect to various requirements. In unsupervised classification, the members of each class are often not well defined, and therefore there are no targets for training. The clustering results vary by using different algorithms, where no clustering algorithm can be universally used to solve all problems. Some algorithms are better than others in the context of catching particular features or under certain conditions. Given an application, different approaches can be compared and the data-driven results can be integrated with other knowledge-based principles or criteria.

A supervised approach assumes, for a training well, that members of each class, or its likelihood, are known. An analytical approach can be directed to capture an analyst's interpretation knowledge into a classifier, which classifies the likelihood of free pipe at each depth. Once a threshold or a fuzzy threshold in likelihood is established, the likelihood output can be converted into a crisp class output. In addition, unsupervised clustering results can be used as targets for future supervised training and other advanced modeling by incorporating an analyst's interpretation knowledge.

In various embodiments, apparatus and methods of cement bond/annular fill analysis can operate as, but are not limited to, an application for postprocessing of available multi-tool logs interacted with analyst's response. The analytical output can be plotted with conventional logs for visualization and decision-making. These methods and apparatus can be implemented for well completion, remedial cementing evaluation, well abandonment evaluation, and other applications.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
    acquiring waveforms and/or other sensor responses under the control of a processor unit, the acquired waveforms and/or other sensor responses being associated with a plurality of tools operating with respect to a pipe or multiple pipes in a borehole, each acquired waveform and/or other sensor responses being collected data collected from a respective tool;
    transforming each acquired waveform and/or sensor response to an attribute correlated to the respective tool from which each acquired waveform and/or sensor response is generated;
    extracting values of each attribute in selected intervals of each respective acquired waveform and/or sensor response by the processor unit operating on the acquired waveform and/or sensor response and storing the extracted values in a memory device;
    performing clustering and classification analysis by the processor unit operating on the attributes as variables and the extracted values of the associated acquired waveforms and/or sensor responses;
    generating data, from the clustering and classification analysis, that characterizes status of the pipe or multiple pipes, characterizes annular material within the borehole surrounding the pipe or multiple pipes in the borehole, or characterizes the status of the pipe or multiple pipes and characterizes the annular material within the borehole surrounding the pipe or multiple pipes in the borehole; and
    outputting the data to a memory.

2. The method of claim 1, wherein outputting, to the memory, the data includes outputting data correlated to status of cement bonding of the pipe or multiple pipes in the borehole.

3. The method of claim 1, wherein outputting, to the memory, the data includes outputting data correlated to characterization of annular materials surrounding the pipe or multiple pipes in the borehole.

4. The method of claim 1, wherein outputting the data includes outputting cement bond and/or annular material characterization classes to the memory.

5. The method of claim 1, wherein extracting values of each attribute in selected intervals of each respective acquired waveform and/or other sensor responses includes extracting values in a time domain or a frequency domain.

6. The method of claim 1, the method includes normalizing the extracted values of each attribute prior to performing the clustering and classification analysis.

7. The method of claim 6, wherein normalizing the extracted values of each attribute includes generating a ratio of a difference between the extracted value and an expected value of a bound pipe response for the respective attribute to a difference between an expected value of a free pipe response for the respective attribute and the expected value of a bound pipe response for the respective attribute.

8. The method of claim 1, wherein acquiring waveforms and/or other sensor responses includes acquiring the waveforms from one or more source data files.

9. The method of claim 8, wherein outputting the data includes outputting cement bonding and/or annular material characterization classes to the one or more source data files.

10. The method of claim 1, wherein performing clustering and classification analysis includes processing the attributes and the extracted values of the associated acquired waveforms and/or other sensor responses by the processor unit arranged to generate one or more of a self organized feature map, hierarchical clustering, or weighted response function classification.

11. The method of claim 10, wherein processing the attributes and the extracted values includes using stored default settings or settings generated from user preferences.

12. The method of claim 1, wherein performing clustering and classification analysis includes quantitatively evaluating cluster quality of a cluster based on a centroid vector generated by the processor unit correlated to the cluster.

13. The method of claim 12, wherein the method includes generating cluster centroid vectors from weighting vectors of each neuron in a self organized feature map analysis or generating an average of the values of attributes in each cluster to form a cluster centroid vector of the respective cluster in a hierarchical clustering analysis.

14. The method of claim 1, wherein the method includes identifying patterns of cement bond and/or annular material characterization using a material signature at a specified depth.

15. The method of claim 1, wherein the method includes performing clustering analysis using a first analysis technique, performing clustering analysis using a second analysis technique, and comparing results of the first analysis technique with results of the second analysis technique.

16. The method of claim 1, wherein performing the clustering classification analysis includes performing the clustering classification analysis using a weighted response function analysis such that weights of the weighted response function analysis are adjusted to determine a best match with respect to one or more of an expected bound pipe response, an expected free pipe response, or a transitional condition between the expected bound pipe response and the expected free pipe response.

17. The method of claim 1, wherein performing the clustering and classification analysis includes merging clusters to form classes based upon a service requirement.

18. The method of claim 17, wherein merging clusters includes merging clusters with a number of classes specified by a user or merging clusters with the classes derived from natural grouping.

19. The method of claim 17, wherein merging clusters includes merging the cluster based on a probability index of each class, the probability index calculated from a weighted response function analysis.

20. The method of claim 1, wherein the method includes refining results from performing clustering and classification analysis such that the refining includes using information in addition the extracting values and associated acquired waveforms and/or other sensor responses and/or using knowledge based criteria.

21. The method of claim 1, wherein the method includes:
validating a classification resulting from performing clustering and classification analysis, the validation using one or more cross plots on a selected training well and a well being tested, each cross plot being a plot of one of the attributes with respect to another one of the attributes; and
if validity on the well being tested meets a threshold level, storing cluster weights derived from the training well in a memory such that the stored cluster weights can be used directly to classify data of a new well without re-clustering.

22. The method of claim 21, wherein the method includes, if validity on the well being tested meets the threshold level, storing rules for cluster merger derived from the training well in a memory such that the stored rules for cluster merger can be used directly to classify data of the new well without re-clustering.

23. The method of claim 1, wherein the method includes displaying, on a display unit, cement bond/annular material classification classes and/or one or more log views correlated to conducting one or more of acquiring the waveforms and/or other sensor responses, extracting the values of each attribute, performing the clustering and classification analysis, or outputting the cement bond/annular material classes.

24. The method of claim 1, wherein the attributes include a refracted acoustic amplitude, a filtered cement bond index, a sum of magnitude at a selected frequency band of an acoustic waveform of a micro seismogram, a far detector count rate from a dual-spaced pulsed neutron logging tool, a ultrasonic average impedance, or combinations thereof.

25. A non-transitory machine-readable storage device having instructions stored thereon, which, when performed by a machine, cause the machine to perform operations, the operations comprising:
acquiring waveforms and/or other sensor responses under the control of a processor unit, the acquired waveforms and/or other sensor responses being associated with a plurality of tools operating with respect to a pipe or multiple pipes in a borehole, each acquired waveform and/or other sensor responses being collected data collected from a respective tool;
transforming each acquired waveform and/or sensor response to an attribute correlated to the respective tool from which each acquired waveform and/or sensor response is generated;
extracting values of each attribute in selected intervals of each respective acquired waveform and/or sensor response by the processor unit operating on the acquired waveform and/or sensor response and storing the extracted values in a memory device;
performing clustering and classification analysis by the processor unit operating on the attributes as variables and the extracted values of the associated acquired waveforms and/or sensor responses;
generating data, from the clustering and classification analysis, that characterizes status of the pipe or multiple pipes, characterizes annular material within the borehole surrounding the pipe or multiple pipes in the borehole, or characterizes the status of the pipe or multiple pipes and characterizes the annular material within the borehole surrounding the pipe or multiple pipes in the borehole; and
outputting the data to a memory.

26. The non-transitory machine-readable storage device of claim 25, wherein the operations include:
validating a classification resulting from performing clustering and classification analysis, the validation using one or more cross plots on a selected training well and a well being tested, each cross plot being a plot of one of the attributes with respect to another one of the attributes; and
if validity on the well being tested meets a threshold level, storing cluster weights derived from the training well in a memory such that the stored cluster weights can be used directly to classify data of a new well without re-clustering.

27. The non-transitory machine-readable storage device of claim 26, wherein the operations include, if validity on the well being tested meets the threshold level, storing rules for cluster merger derived from the training well in a memory such that the stored rules for cluster merger can be used directly to classify data of the new well without re-clustering.

28. The non-transitory machine-readable storage device of claim 25, wherein performing clustering and classification analysis includes quantitatively evaluating cluster quality of a cluster based on a centroid vector generated by the processor unit correlated to the cluster.

29. The non-transitory machine-readable storage device of claim 28, wherein the operations include generating cluster centroid vectors from weighting vectors of each neuron in a self organized feature map analysis or generating an average of the values of attributes in each cluster to form a cluster centroid vector of the respective cluster in a hierarchical clustering analysis.

30. A system comprising:
a processor unit;
a memory unit operably coupled to the processor unit; and
an analysis unit, wherein the processor unit, the memory unit, and the analysis unit are configured to operate to:
acquire waveforms and/or other sensor responses under the control of the processor unit, the acquired waveforms and/or other sensor responses being associated with a plurality of tools operating with respect to a pipe or multiple pipes in a borehole, each acquired waveform and/or other sensor responses being collected data collected from a respective tool of the plurality of tools
transform each acquired waveform and/or sensor response to an attribute correlated to the respective tool from which each acquired waveform and/or sensor response is generated;

extract values of each attribute in selected intervals of each respective acquired waveform and/or sensor response by the processor unit operating on the acquired waveform and/or sensor response and storing the extracted values in a memory device;

perform clustering and classification analysis by the processor unit operating on the attributes as variables and the extracted values of the associated acquired waveforms and/or sensor responses;

generate data, from the clustering and classification analysis, that characterizes status of the pipe or multiple pipes, characterizes annular material within the borehole surrounding the pipe or multiple pipes in the borehole, or characterizes the status of the pipe or multiple pipes and characterizes the annular material within the borehole surrounding the pipe or multiple pipes in the borehole; and output the data to a memory.

31. The system of claim 30, wherein the analysis unit includes memory in addition to the memory unit, the memory unit located on a network.

32. The system of claim 30, wherein the memory unit includes electronic source files arranged to store waveform and/or other sensor response data from measurement tools operating with respect to the pipe or multiple pipes within the measurement volume.

33. The system of claim 30, wherein the processor unit includes a plurality of processors.

34. The system of claim 30, wherein the system includes the plurality of tools.

* * * * *